United States Patent
Kostan et al.

(12)

(10) Patent No.: US 6,396,911 B1
(45) Date of Patent: May 28, 2002

(54) METHOD AND APPARATUS FOR EFFICIENT IMPROVED DATA TRANSMISSIONS ON TELEPHONE LINKS BETWEEN SERVICE PROVIDERS AND REMOTE CLIENTS

(75) Inventors: Dean Anthony Kostan, Algonquin; Avinash K. Vaidya, Riverwoods; Patrick I. Lazar, Gurnee; Juan Ramon Uribe, Elmhurst; Louis Poirier, Buffalo Grove; Xiaoyue Zhong, Mundelein; Yamel Torres, Chicago, all of IL (US)

(73) Assignee: Charles Industries, Ltd., Rolling Meadows, IL (US)

( * ) Notice: Subject to any disclaimer, the term of this patent is extended or adjusted under 35 U.S.C. 154(b) by 0 days.

(21) Appl. No.: 09/292,270

(22) Filed: Apr. 15, 1999

Related U.S. Application Data

(63) Continuation-in-part of application No. 09/259,612, filed on Mar. 1, 1999.

(51) Int. Cl.$^7$ .............................................. H04M 11/00
(52) U.S. Cl. ................................. 379/93.14; 379/93.08; 375/222
(58) Field of Search ........................... 379/93.14, 93.08, 379/90.01, 93.28–93.34; 375/222

(56) References Cited

U.S. PATENT DOCUMENTS 5,809,075 A * 9/1998 Townshend .................. 375/222
5,887,027 A * 3/1999 Cohen et al. ................ 375/222

* cited by examiner

*Primary Examiner*—Wing F. Chan
(74) *Attorney, Agent, or Firm*—Leydig, Voit & Mayer, Ltd.

(57) ABSTRACT

A method and apparatus are provided for efficient improved data transmissions on telephone links between service providers and remote clients. The method and apparatus perform the steps of receiving an analog encoded data signal, selectively routed by a switch which is communicatively connected to a set of central office switch assembly codecs, and performing a high precision, synchronized analog to digital conversion while the signal is relatively close to a phone company central office switch assembly. The signal is transferred to output circuitry used to transmit signals on phone company subscriber lines. The signal is converted back to an analog signal prior to its final transmission to a subscriber client modem. In an embodiment of the invention, the high precision, synchronized analog to digital conversion is performed by a client-type modem and the output is transferred to a server-type modem which transmits the converted signal, in digital form, over a pair gain system. In an alternative embodiment, the client-type modem resides on the central office terminal side of a pair gain system and the server-type modem resides on the remote terminal side of the pair gain system.

42 Claims, 14 Drawing Sheets

METHOD AND APPARATUS FOR EFFICIENT IMPROVED DATA TRANSMISSIONS ON TELEPHONE LINKS BETWEEN SERVICE PROVIDERS AND REMOTE CLIENTS

This Application is a C.I.P. of Ser. No. 09/259,612 filed Mar. 1, 1999.

AREA OF THE INVENTION

The invention generally relates to the area of telephonic data transmission facilities. More particularly, the present invention concerns methods and apparatuses for improving the signal quality, and thus data rate, of telephonic links between service provider modems and subscriber client modems.

BACKGROUND OF THE INVENTION

The V.90 (56 Kbps) modem protocol was introduced with much fanfare by manufactures, and Internet users rushed out to get their hands on the answer to their frustrations arising from slow downloads of information from the Internet via Internet service providers (ISPs). Before, the V.90 protocol was introduced, the highest speed for such data transfers was 33.6 Kbps via V.34 protocol modems. The V.90 modems are theoretically capable of receiving data from a sender at about a 50% faster rate. However, theory and reality are two very different concepts. This has certainly been the case with V.90 modems.

As many disappointed users of 56 Kbps modems discovered, having the fastest telephone-based client modem on the Internet does not mean that the user's computer will receive information from an Internet service provider at the highest theoretically available data rate. The best client modems on the market today are theoretically capable of receiving data from ISPs using the V.90 protocol at a rate of over 50 Kbps and sending data using the V.34 protocol at a rate of over 33 Kbps. However, when a user of these state-of-the-art modems attempts to remotely connect to an ISP server advertised to support V.90 connections, the user's lofty expectations of high speed transmissions are brought down to earth when the user receives notification from the computer that the connection was established (negotiated) at a lower speed than the expected rate of over 50 Kbps. For example, rather than 50 Kbps, the user's modem connects at a receive rate less than 40 Kbps, a speed much closer to the 33.6 Kbps of last year's clearance shelf modems.

Who is responsible for the owners of V.90 client modems inability to connect to an ISP V.90 server modem at the maximum bit rate? It's not the ISP's fault. The V.90 ISP modems today are indeed capable of transmitting at the maximum rate under the V.90 protocol—about 50 Kbps. Manufacturers of V.90 modems are not to blame either. The modem is indeed capable, under favorable conditions, to accurately receive data in accordance with the V.90 protocol at an effective transfer rate of over 50 Kbps.

In actuality no one is wholly responsible for V.90 modems present performance shortcomings in the real world. The problem arises from the fact that developers of the V.90 protocol pushed the capabilities of twisted pair copper wire, the primary means for transmitting telephone signals from central offices to end-users, to its limit. Having done so, the V.90 protocol works in a noise-free laboratory environment and under certain, limited, uses outside the laboratory—such as when a user is within shouting distance of the central office (CO) of its telephone service provider. This is not a likely scenario for most users of V.90 client modems. In fact, the problem of less than ideal telephone signal transmission media creates problems for Internet subscribers at even lower transmission speeds using the older V.34 protocol having greater noise margins.

The source of the problem is the marketplace's unquenchable thirst for high speed data transmission. Both the providers and the receivers of information want data transmissions to occur at substantially higher rates than the transmission rates when the telephone companies laid their massive networks of local subscriber lines. However, the high performance transmitters and receivers cannot make up for a transmission media that simply cannot satisfactorily transmit the information at such a high rate, over the required distances, under real world circumstances—including noise, interference, and power limitations. The solution rests in the hands of the parties responsible for transmitting the signals from the ISPs to the users—the phone companies. To that end, the phone companies could scrap the old twisted wire for optic fiber and coaxial cable. Such solutions are extremely costly and require overhauling the twisted wire network laid down by phone companies over several decades. As a result, achieving the maximum data transmission rates using V.90 modems is not a likely event for many, if not most, typical phone service customers.

Today, "pair gain" technology provides enhanced digital data transmission over twisted pair copper lines between central offices (COs) and end-users. Pair gain technology uses the pre-existing twisted pair copper wire technology and transmission media. However, pair gain systems apply their own set of data transmission protocols, including A/D and D/A conversion at the central office and end-user connections, respectively. An advantage of pair gain systems provided to phone companies is the ability of phone companies to add phone lines without increasing the number of twisted pair wires for a given area served by a single twisted pair. A single twisted pair line can be transformed from handling a single phone line to one handling two or more phone lines.

Another advantage of pair gain systems is that they provide enhanced signal transmission quality over the twisted wire media. In particular, known pair gain systems are capable of transmitting digitized data over longer distances, and with fewer errors than standard analog transmissions over the same twisted pair transmission media. One such provider of pair gain systems is Charles Industries, Ltd., 5600 Apollo Drive, Rolling Meadows, Ill.

However, even pair gain systems cannot overcome some shortcomings of twisted wire phone networks that were initially intended to convey, using an analog signal, a recognizable voice rather than errorless digital information. As a result, by the time a data signal from a V.90 ISP modem reaches the central office terminal of a pair gain system, the signal has been degraded by passes through one or more analog telephone switches. The central office terminal of the pair gain system converts the analog signal from the central office switch to a digital signal. The remote terminal (at the telephone subscriber's location) converts the digital signal from the central office terminal back to the analog signal transmitted by the central office switch. Inserting the A/D and D/A conversion by the pair gain system into the transmission path between the ISP and the telephone service subscriber causes a signal loss that prevents successful transmission of data between ISPs and users at the maximum available rate under the V.90 protocol.

Providing a solution to the aforementioned problem undoubtedly requires some form of upgrade of existing signal transmission technology. Upgrading such technology typically involves added costs for equipment. However, not every customer will likely need the upgraded line connection all the time—if at all. In fact, customers who do not intend to reap the benefits of improved modem line service from a phone service provider may in-fact complain if they are made to share the added cost of providing premium line service to phone service customers.

SUMMARY OF THE INVENTION

The present invention improves the quality and accuracy of data transmissions in order to overcome some, if not all, of the problems encountered when attempting to realize the advertised capabilities of the present state-of-the-art voice band modems. The method and apparatus of the present invention seeks to provide a high precision, reliable, and economically practical high-speed link between server modems and subscriber client modems connected by a path that includes at least one analog transmission link. In particular, the high-speed link is only provided to those who only wish to have access to the service. Furthermore, the high-speed link apparatus is shared by multiple potential users on a floating basis. Therefore, for a pair gain system serving N POTS channels, a set of M premium connection lines are provided to the N POTS channels on a floating basis. The number of premium connection lines M is less than the number of POTS channels N. For example, two floating premium line connections are provided for a set of eight POTS channels served by a pair gain system.

In accordance with the present invention, a first encoded analog data signal is transmitted over analog transmission media, such as twisted pair wire. The first encoded analog data signal corresponds to an original data set to be transmitted from a service provider modem to a subscriber client modem. A demodulator, such as the type found in client-type modems, receives the encoded analog data signal and recovers the encoded digital data from the analog signal. Digital data corresponding to the recovered digital data is again encoded to render a second encoded analog data signal substantially the same as the first encoded analog data signal. The second encoded analog data signal is received by a subscriber client modem. The connection described above is dynamically configured, and switched in by a control processor when the need arises for the premium transmission functionality provided by the aforementioned data signal transmission apparatuses.

In accordance with another aspect of the present invention, a server-type modem encodes digital data rendered from the first recovered digital data set. In a particular claimed embodiment of the present invention, the server-type modem is located at the central office terminal. In that case, the server-type encoding functions are performed on data arising from the first recovered digital data set before the data is transmitted from a central office terminal to a remote terminal of a digital link (e.g., a pair gain system). In another particular embodiment of the present invention, the server-type modem is located at the remote terminal. In that case, the server-type encoding functions are performed after the digital data has been transmitted from the central office terminal to the remote terminal of the digital link.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF ILLUSTRATIVE EMBODIMENTS OF THE INVENTION

Figure 1:
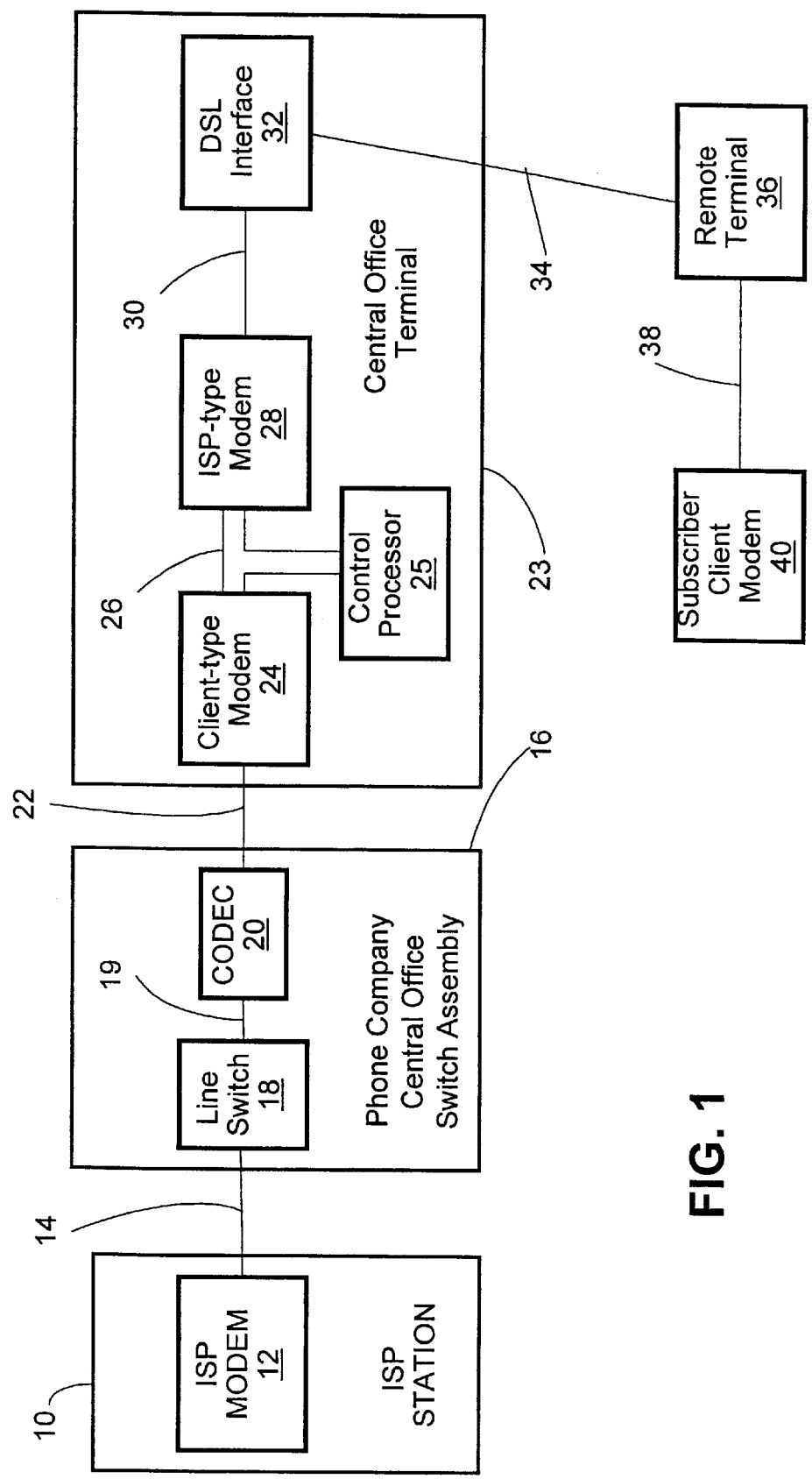
FIG. 1 is a high level schematic block diagram identifying the primary components of a connection between an ISP modem and a subscriber client modem in a system including high-speed modem connection hardware.

Turning now to FIG. 1, a high level block diagram schematically depicts primary components in a connection between an ISP modem and a subscriber client modem in accordance with an exemplary embodiment of the invention.

An Internet Service Provider (ISP) station 10 provides public access to the resources of the Internet via a bank of modems including an ISP modem 12. In accordance with a preferred embodiment of the present invention, the ISP modem 12 is a V.90 56 Kbps modem that transmits data downstream to a user using the V.90 protocol and receives data from connected subscribers in accordance with one of the pure analog transmission protocols such as V.34. While such a modem is indeed the preferred ISP modem 12 at present, those of ordinary skill in the art will appreciate the applicability of the present invention to other modems, including future proposed modems that are capable of transmitting and receiving modem data at the current downstream transmission rate of V.90 ISP modems.

Next, the transmitted data is conveyed to a phone company central office switch assembly 16 in a PCM code digital format on digital link 14. The digital link 14, after traversing potentially several intermediate switches (not shown) terminates at a line switch 18 for selectively communicatively coupling the digital link 14 to a telephone subscriber line. Lines 19 communicatively couple line switch 18 to a pulse code modulation (PCM) codec 20 including a digital-to-analog converter (DAC) that receives downstream digital data values (from zero to 255) and converts the digital data values into a representative analog electrical signals that are transmitted on twisted pair line 22 to a Central Office Terminal (COT) 23 of a pair gain system. In the preferred embodiment of the invention, the codec 20 generates voltage levels transmitted on twisted pair line 22 at a rate of 8000 times per second.

During a modem data transmission, analog signals transmitted by the codec 20 are received by a client-type modem 24 that decodes the analog signal to render a recovered data set corresponding to the original data set encoded by the ISP modem 12. The length of the twisted pair line 22 is preferably less than 100 ohms (100 feet for 26 gauge wire). It is noted that while the COT 23 is shown separately from the phone company central office switch assembly 16, the COT 23 can, and will often, be located in the same physical building as the phone company central office switch assembly 16. In fact, in embodiments of the present invention, the twisted pair line 22 is on the order of a few feet in the case where a bank of client-type modems, of which the client-type modem 24 is an example, are housed relatively close to the codec 20 within the phone company central office switch assembly 16.

With regard to the downstream modem data path originating at the ISP server station 10, the client-type modem 24 includes a high precision, synchronized, analog-to-digital converter (ADC) that senses the voltage level of the analog signal on line 22. The client-type modem 24 also performs all the other data demodulation operations for a typical V.90 client modem to recover the original data set from the received analog voltages. As used herein, the term "client-type modem" refers to electronic circuitry and/or computer instructions facilitating preserving data integrity when the data is converted from its received form to digital data. In the presently preferred embodiment, such requirements include (a) a high resolution analog-to-digital converter (e.g., 12-bit or better), and (b) signal synchronization (e.g., oversampling) to ensure a proper sampling window. Such requirements are met by, for example, the Lucent Technologies L56XVCS high integration controller-based modem chip set. Other requirements may exist in other embodiments of the present invention.

Continuing with the description of FIG. 1, a control processor 25 transfers the decoded recovered data set from the client-type modem 24 via a parallel data bus 26 to an ISP-type modem 28. Of course other data paths could be used to communicatively couple the client-type modem 24 and the ISP-type modem 28. For example, direct data transfers between the client-type and ISP-type modem 28 eliminate an intermediate transmission to the control processor 25 and therefore reduces the processing load upon the control processor 25. Such a direct transfer would occur under the control of the control processor 25, but only a single data transfer (directly from the client-type modem 24 to the ISP-type modem 28) occurs. The ISP-type modem 28 encodes the data set received on the parallel data path 26 from the client-type modem 24 via the control processor 25. In addition to converting the data set into PCM coded digital data, the ISP-type modem 28 performs, if needed, data compression and other digital data processing known to those skilled in the art. The output from the ISP-type modem 28 on line 30 (actually a set of two lines, one for transmitting signals, one for receiving signals) to a DSL interface 32 of the COT 23 of a pair gain system is substantially the same as the digital signal transmitted on line 14 from the ISP modem 12. In the presently preferred embodiment, the downstream data is output from the ISP-type modem 28 in the form of PCM encoded digital data.

The term "ISP-type modem" used herein above refers to an actual ISP modem or to functionally equivalent electronic circuitry and/or computer instructions facilitating taking input data and converting the data to a form expected for output by an ISP-type modem. An example of the ISP-type modem is the Lucent Technologies L56XVCS high integration controller-based modem chip set. "Server-type modem" is a general instance of a modem providing data communication functionality for a server in a network. An "ISP-type modem" is a specific instance of a "server-type modem."

After receiving the encoded digital data on line 30, the DSL interface 32 converts the digital data into HDSL (high-rate digital subscriber line) frames. The digital frame data is transmitted over twisted pair wire line 34 to a remote terminal (RT) 36 containing a complimentary DSL interface, codec and control processor. The RT 36 is typically located at a phone line subscriber's residence or place of business. Data transmission over twisted pair line 34, and through the entire pair gain system, comprising the COT 23 and RT 36, is full-duplex and at an adequate rate to keep up with the high speed data transmission rates of 56 Kbps modems so that no bottleneck arises from inserting the pair gain system within the data path from the ISP modem 12 to a phone line subscriber's residence or place of business. The pair gain system enables the signal from the central office to be transmitted at a high rate, over longer distances, and with improved quality. In many instances, if not for the existence of the pair gain system, the analog signal on line 22 could not be transmitted with a reasonable degree of confidence to a remote subscriber client modem. The pair gain system provides the additional benefit of enabling multiple subscriber lines to be served by the single twisted pair line 34. In fact, the RT and COT circuitry disclosed in FIGS. 2 and 5 and described herein can be duplicated and multiplexed to support multiple modem connections at the same time.

The RT 36 receives the digital frame data on line 34 and extracts the digital data from the DSL frames. An 8 bit codec (256 potential levels) within the RT 36 converts the extracted digital data into an analog level signal transmitted on line 38 to a subscriber client modem 40. The subscriber client modem 40 decodes the received PCM signals received on line 38 to render a recovered data set equal to the original data set encoded and transmitted by the ISP modem 12. It will be noted that errors, due to real world circumstances and conditions do occur during data transmission. These errors are corrected by a number of correction procedures and algorithms that will be known to those skilled in the art. Therefore, when a recovered data set is described herein as being equal to, the same as, or corresponding to another data set (such as the original data set), it should be understood to include imperfect transmissions with acceptable, detectable or correctable errors.

The downstream transmission path has been described in detail above. In the preferred embodiment of the present invention, the upstream data path is directed through the same components generally described for downstream data transmission. However, the manner in which the data is transmitted upstream differs from downstream transmission. In contrast to the data signal transmitted by the ISP modem 12 in downstream data path, which incorporates the V.90 protocol, the upstream data signal originates from the subscriber client modem 40 in the form of an analog signal corresponding to the V.34 analog transmission protocol. With continued reference to FIG. 1, the upstream transmission path is briefly summarized below.

Upstream data transmission from the subscriber client modem 40 originates as an analog signal containing encoded data that the subscriber client modem 40 transmits on line 38 to the RT 36 according to the V.34 analog transmission protocol. The codec within the RT 36 converts the analog signal containing encoded data received on line 38 to PCM encoded data at a sample, rate of 8000 samples per second. The DSL chip set within the RT formats and transmits the PCM encoded data in the form of HDSL data frames on twisted pair line 34 to the COT 23. The DSL interface 32 of the COT 23 extracts the PCM encoded data from the HDSL frames and transmits the PCM encoded data on line 30 to the ISP-type modem 28. The ISP-type modem 28 receives the PCM encoded data and performs digital data processing to render a copy of the original data encoded and transmitted by the subscriber client modem 40. The copy of the original data is transferred by the control processor 25 via lines 26 to the client-type modem 24. The client-type modem 24 again encodes the received data and transmits an analog signal in V.34 format corresponding to the analog signal originally transmitted by the subscriber client modem 40. The analog signal is received and PCM encoded by the PCM codec 20 including an analog-to-digital converter (ADC). The digital PCM encoded signal is routed to digital link 14 via the switch 18. The PCM encoded digital signal is decoded by the ISP modem 12 to render the original data encoded and transmitted by the client modem 40.

Having described exemplary downstream and upstream transmission paths in a system incorporating the present invention, it is noted that there is no intention to limit the scope of the invention to this specific embodiment. For example, while the preferred embodiment generally follows V.90 downstream and V.34 upstream, there is no intention to limit the invention to this configuration. As those skilled in the art will appreciate from the exemplary embodiment, the present invention is applicable to many configurations and data transmission protocols including modems which transmit and receive digitally, but wherein a transmission path contains one or more analog transmission links.

As those of ordinary skill in the art will readily appreciate, several simplifications have been incorporated into FIG. 1. For example, while only a single switch 18 within a phone company central office switch assembly 16 is shown in FIG. 1, those skilled in the art will understand that in fact a connection may include multiple switches and repeaters between the ISP 10 and the COT 23. Likewise, those skilled in the art will readily appreciate that the single RT 36 between the COT 23 and the client modem 40 can be a string of RT's daisy chained with each RT being capable of terminating a single or group of plain old telephone (POT) channels to which a subscriber may attach modems and plain old telephones (POTS). It is also noted that the term "communicatively coupled" as used herein is intended to broadly cover both direct linkages between two components in a transmission path as well as. indirect linkages which include one or more intermediate links between two "communicatively coupled" components.

It is also noted that the present invention is applicable to systems that do not include a pair gain system. For example, a codec such as codec 20 is added to the output of the COT 23 thus converting the downstream digital output of the COT to an analog signal. One or more of such modified versions of the COT 23 are chained together (in repeater fashion) to extend the distance and/or quality of analog data signal transmissions between a phone company central office and subscriber client modems.

Figure 2:
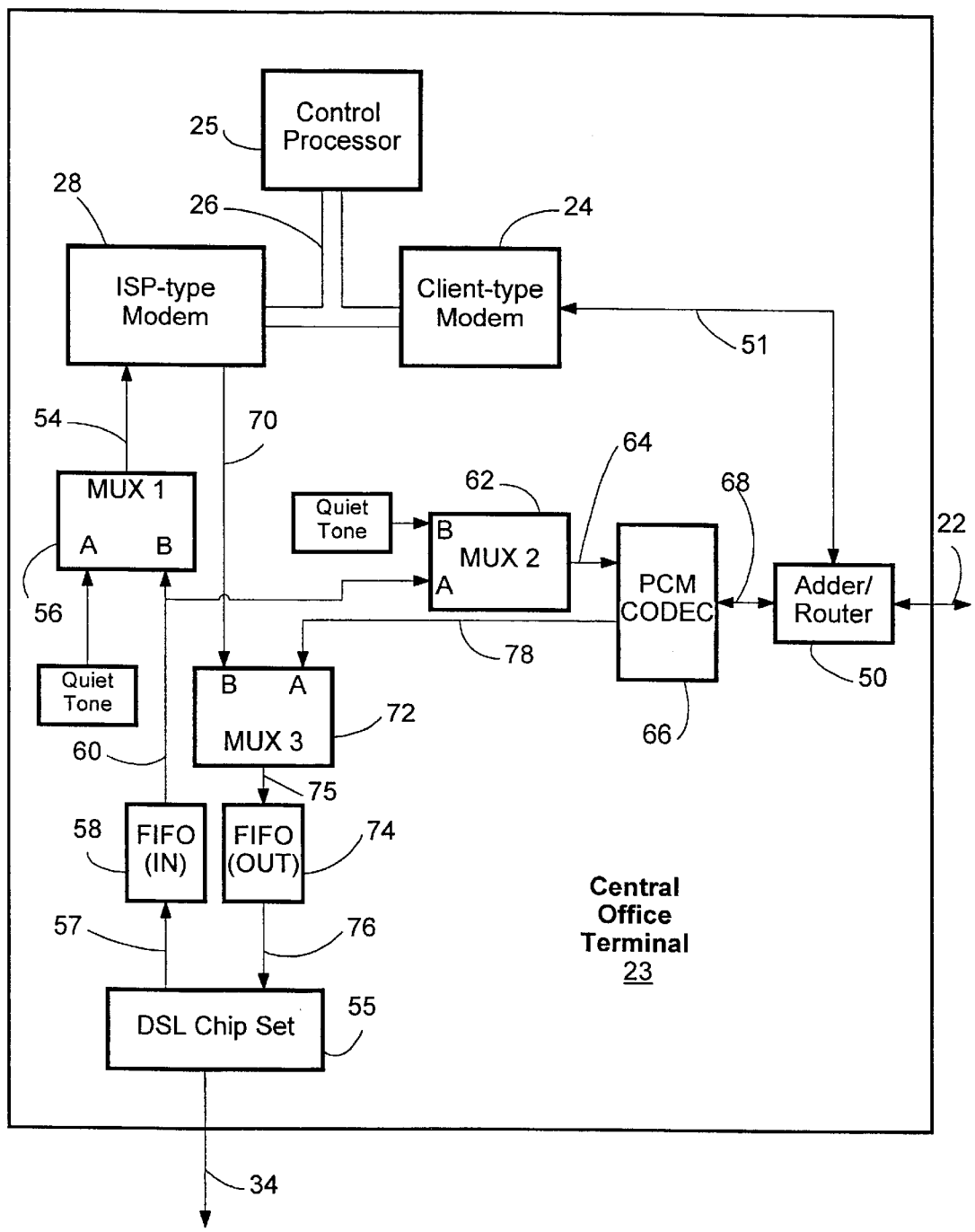
FIG. 2 is a mid-level schematic block diagram of the central office terminal including client-type and ISP-type modems in the ISP modem/subscriber client modem connection depicted in FIG. 1.

Turning now to FIG. 2, a schematic block diagram is provided of a COT 23 including a client-type modem 24 and ISP-type modem 28 combination embodying the present invention. The analog adder/router 50, passes an input analog signal on line 51 to the client-type modem 24. The parallel data bus 26 connects the control/data bus of the control processor 25 to the client-type modem 24 and ISP-type modem 28. The control processor 25 is programmed to control the operations of the ISP-type modem 28 and client-type modem 24 and to extract and transfer the received digital modem data between the client-type modem 24 and ISP-type modem 28.

During a digital data modem call all the MUXs are switched to position "B." PCM encoded data is transmitted to the ISP-type modem 28 on line 54 from a MUX1 56. In such instances, HDSL encoded data is received by DSL chip set 55 via twisted pair line 34. The DSL chip set 55 transmits PCM encoded data via line 57 to a slip FIFO 58. The buffered PCM encoded data passes through MUX1 56 and emerges on line 54 and is received by the ISP-type modem 28. During a data modem call, a quiet tone is transmitted by MUX2 62 on line 64 to a PCM codec 66 so that the output signal on line 68 to the adder/router 50 does not interfere with an output analog data signal transmitted on line 51 from the client-type modem 24 to the adder/router 50.

During a non-modem data, analog, call (i.e., the modems 24 and 28 are not being used), such as when a voice call is. being handled all MUXs are switched to position "A" by the control processor 25. Thus, MUX1 56 transmits a quiet tone data pattern on line 54 to the input of the ISP-type modem 28. MUX2 62 routes data received from the DSL chip set 55 from a slip FIFO 58 via line 60 to line 64. Line 64 carries the received data to the PCM codec 66. The PCM codec 66 converts the encoded PCM signal to an analog signal which is then transmitted on line 68 to the analog adder/router 50. The analog adder/router 50 sums the signal on line 51 with the signal on line 68. However, since a quiet tone is transmitted to the ISP modem 28 during the time period when analog voice data is transmitted on line 68, the output of client modem 24 is null value, and the output of the analog adder/router 50 on line 22 corresponds to the input on line 68.

With regard to transmissions of digital data from the COT 23, the ISP-type modem 28 transmits PCM encoded data on line 70 to MUX3 72. MUX3 72 is configured to transmit, during a modem data call, the PCM encoded data from line 70 to a slip FIFO 74 via line 75. The slip FIFO 74 transmits the PCM encoded data on line 76 to the DSL chip set 55. The DSL chip set 55 performs the necessary data transformations to render data transmissions from the COT 23 to the RT 36 in HDSL frame format.

With continued reference to FIG. 2, during a voice call, (MUX position "A" selected) the PCM codec 66 transmits encoded voice data on line 78 to the MUX3 72. The MUX3 72 passes the encoded signal via line 75 to the slip FIFO 74 which in turn passes the encoded signal on line 76 to the DSL chip set 55. The DSL chip set 55 passes the encoded data on twisted pair line 34 to the RT 36. It is noted that the manner of controlling routing described herein above is exemplary, and is not intended to limit the present invention. Those skilled in the art will appreciate that a wide variety of routing schemes could be used while practicing the present invention.

Finally, with continued reference to FIG. 2, the RT 36 in the embodiment of the present invention depicted in FIG. 1 is unmodified from the prior known devices. In other words, there are no special circuits for multiplexing between an analog voice phone configuration and a modem data configuration. Thus, removing the multiplexing circuits and modems from FIG. 2 would render the RT for the system depicted in FIG. 1. The processor 25, DSL chip sets 55, FIFO's 58 and 74 and PCM codec 66 continue to be present in the RT. The ISP-type and client-type modems, and switching circuitry are not present in the RT for the embodiment depicted in FIG. 1. However, in an alternative embodiment depicted in FIGS. 4, 5 and 6 the RT contains an ISP-type modem and does include the switching circuitry. This embodiment will be described further herein below after the start-up scheme for a modem data call has been described.

Figure 3:
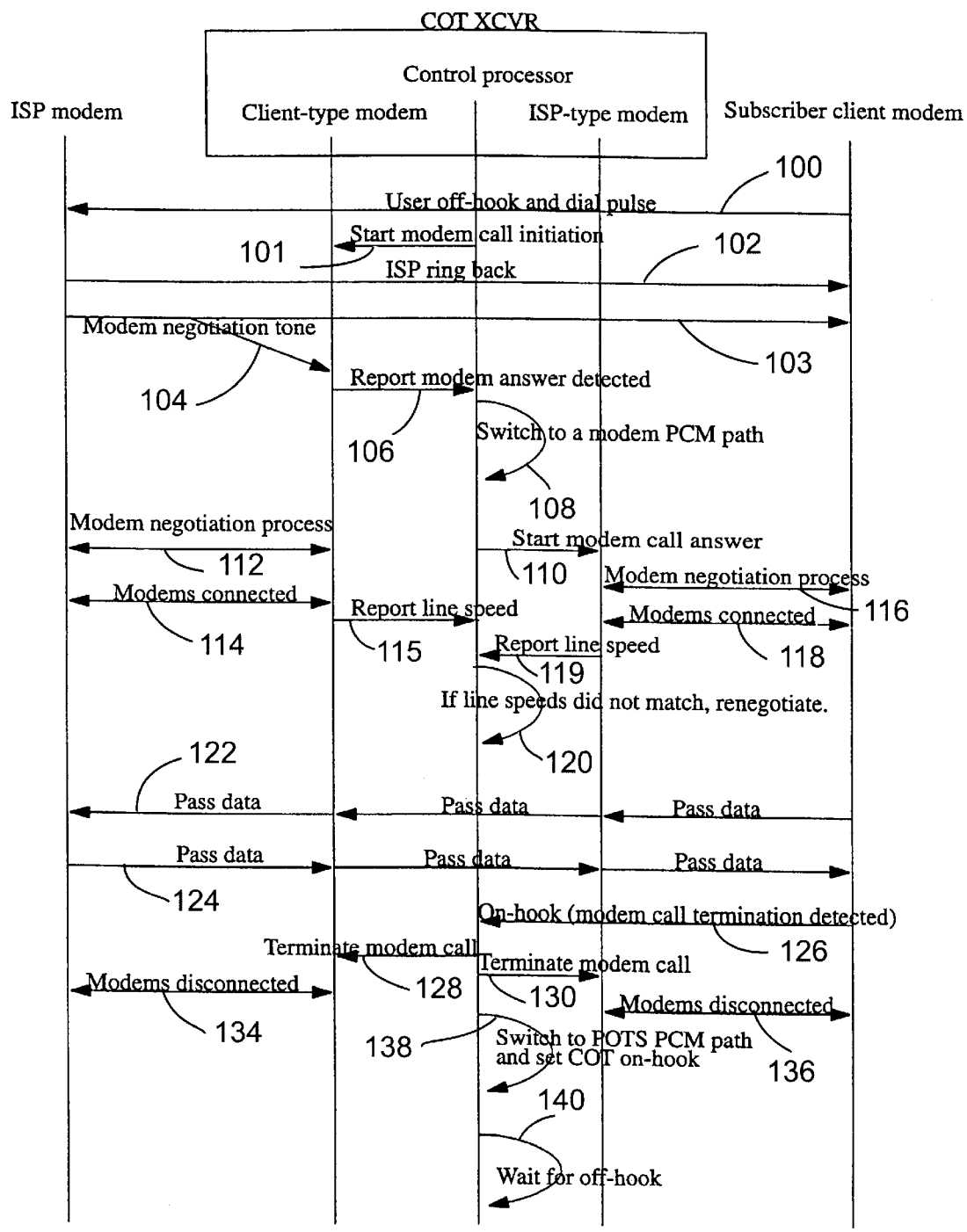
FIG. 3 is a stage/timing diagram of the start-up, operation, and shut down of a session between an ISP modem and a client modem in a network having a connection of the type depicted in FIG. 1.

Turning now to FIG. 3, a timing/stage diagram depicts the start-up, data transmission, and disconnection procedures performed by the apparatuses depicted in FIG. 1. At stage 100 the user modem off hook state is detected and dial pulses from the subscriber client modem 40 are carried via the analog call path through the upstream transmission path from the subscriber client modem 40 to the ISP modem 12. At stage 101 the control processor 25 in the COT 23 initiates modem call procedures in the client-type modem 24. In response to a successful dial sequence, during stage 102 a ring-back is returned by the phone company central office switch assembly 16 to the subscriber client modem 40 via the analog call paths through the COT 23 and RT 36. At stage 103 a negotiation tone from the ISP modem 12 passed via the voice path through the COT 23 and onto the subscriber client modem 40.

At stage 104 the ISP modem 12 negotiation tone is sensed by the client-type modem 24. In response, at stage 106 the client-type modem 24 reports to the control processor 25 that it has detected a modem negotiation tone from the ISP modem 12. The control processor 25 switches MUXs 56, 62 and 72 to the modem data path "B" (cutting off the negotiation tone from downstream modems) at stage 108 and issues control commands to the ISP-type modem 28 to initiate a modem session with the subscriber client modem 40 at stage 110. During stage 112, the client-type modem 24 and ISP-type modem 12 negotiate the transfer protocol and maximum data rate to be used for downstream and upstream data transmissions. The presently preferred default protocols are V.90 downstream and V.34 upstream that have a maximum data rate of 56 Kbps and 36.6 Kbps respectively. At stage 114, the negotiation is completed and the client-type modem 24 has established a connection to ISP modem 12. During stage 115 the client-type modem 24 reports the downstream and upstream line speeds to the control processor 25. Concurrently, the ISP-type modem 28 and the subscriber client modem 40 carry out their own protocol and data rate negotiation at stage 116 and establish a connection at stage 118. At stage 119, the ISP-type modem reports the downstream and upstream line speeds to the control processor 25.

In the preferred embodiment, the line speeds between all modems are equalized to lessen the chances that a bottleneck will arise in the transmission path between the ISP modem 12 and the subscriber client modem 40. This is not essential in view of the ability of some modem protocols to allow the issuance of pause commands to another modem to allow another modem to clear at least a portion of a near-full buffer. Less elegant solutions allow for data to be lost when a buffer overflows and require re-transmitting the data when sufficient space exists in the buffer. In the illustrative embodiment, where line speed equalization is sought, at stage 120 the control processor 25 compares the line speeds reported during stages 115 and 119. If the line speeds are not equal, the control processor issues a command, or commands to the appropriate modem(s) to cause the modems to re-negotiate line speed at the slower or the reported line speeds for both downstream and upstream transmissions. For example, if the client-type modem 24 connects at 50 Kbps downstream and the ISP-type modem 28 connects at 44 Kbps, then the control processor 25 issues commands to the client-type modem 24 to re-negotiate its connection to the ISP modem 12 at 44 Kbps.

Thereafter, stages 122–124 represent the bi-directional data streams that are supported after the modems have been trained, and retrained if necessary to synchronize on a single set of upstream and downstream data rates. When the user is finished, at stage 126 the RT 36 detects that subscriber client modem 40 has hung up and in response issues an end modem call message which is received by the control processor 25. Of course a similar process is performed if the ISP modem 12 hangs up to initiate a disconnect procedure. In response, the control processor 25 issues call termination commands to the client-type modem 24 and ISP-type modem 28 during stages 128 and 130, respectively. On the ISP modem 12 side, at stage 134 the ISP modem 12 and client type modem 24 end the phone call and disconnect. On the subscriber client modem 40 side, the ISP-type modem 28 and subscriber client modem 40 end the phone call and disconnect at stage 136. Thereafter, at stage 138 the control processor 25 switches the MUXs 56, 62 and 72 to the analog call position "A" and the COT 123 is set to the "on-hook" state. Finally, at stage 140 control processor 25 enters a wait state for sensing off-hook from the RT.

A general description of the dial-up, connect, communicate, and disconnect procedure for a network connection embodying the present invention has been provided. However, it is noted that those skilled in the art will appreciate, in view of this description, that the order of some stages need not occur in the exact manner described above. It is further noted that modifications to the data transmission path from the ISP modem 12 to the subscriber client modem 40 need not be through the exact same path depicted in FIG. 1 in order to fall within the intended scope of the present invention. Therefore, the present invention is intended to cover variations of the steps described above falling within the spirit and scope of the claimed invention defined below. Such embodiments include rearranging the steps and adding additional steps to account for insertion of additional modems into the transmission path and other modifications to the IS illustrative embodiment shown in FIG. 1 that would be known to those skilled in the art.

Figure 4:
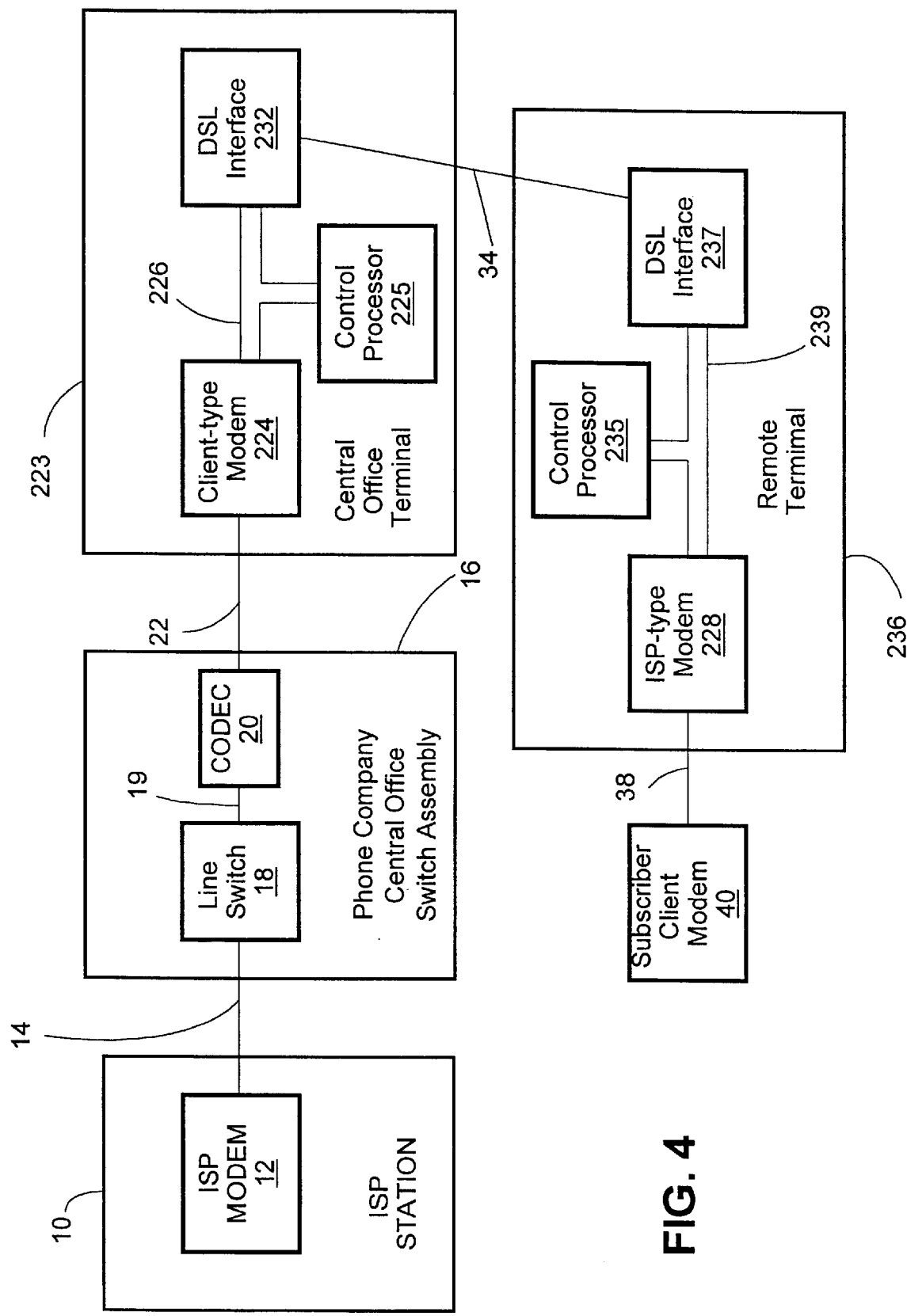
FIG. 4 is a high level schematic block diagram identifying the primary components of a connection between an ISP modem and a subscriber client modem in accordance with an alternative embodiment of the ISP modem/subscriber client modem connection depicted in FIG. 1.

Turning now to FIG. 4, an alternative embodiment of the present invention is schematically depicted in block diagram format. Same numbers are used to identify similar components from the description of FIG. 1, new reference numbers indicate new or modified structures. Rather than repeat the discussion of the unchanged portions of the block diagram provided above for FIG. 1, attention will be directed to the modified portions of the drawing.

The primary difference between the preferred embodiment in FIG. 1 and the alternative embodiment depicted in FIG. 4 is the relocation of the ISP-type modem from the COT side of the pair gain system to the RT side. This particular arrangement is envisioned if the subscriber client modem 40 is capable of sending data upstream in accordance with a higher rate than the 33.6 Kbps under the V.34 protocol. Such circumstances may require a high precision analog-to-digital conversion of a signal received from a subscriber client modem. Placing an ISP-type modem at the RT side may be beneficial in the event that a subscriber client modem is provided the capability to transmit upstream using V.90 or a digital transmission protocol.

With reference to FIG. 4, an ISP-type modem 228 receives/transmits PCM encoded data from/to a codec (not pictured) that receives/transmits analog data signals from/to the subscriber client modem 40 via lines 38. In the event that such signals are digital, the codec would not be used. For a subscriber client modem 40 that transmits using the V.34 protocol, an 8-bit codec is satisfactory. In higher speed transmission protocols, higher precision, synchronized codecs will be used such as the ones found in V.90 client modems. Control Processor 235 and DSL interface 237 are explicitly depicted in order to show the interconnection of the ISP-type modem 228, the control processor 235 and DSL interface 237 by a data bus 239. While a direct connection does indeed exist between the ISP-type modem 228 and the DSL interface 237, the control processor 235 performs the transfer of data between the ISP-type modem 228 and the DSL interface 237. The modifications on the RT side of the transmission path are described in greater detail below in conjunction with FIG. 5. Other potential modifications to the RT and other circuitry on the subscriber side of the pair gain system will be known to those skilled in the art in view of this description, including data compression procedures and other digital signal processing to ensure that the pair gain system can meet the throughput capabilities of the ISP-type modem 228 and client-type modem 224.

With regard to the COT 223, the control processor 225, performs the transfer of data between the client-type modem 224 and the DSL interface 232. A potential bottleneck may occur over the pair gain system if the data transferred from the ISP modem and the subscriber modem 40 is in compressed format. In such instances, the output of the client-type modem 224 and ISP-type modem 228 would likely be in uncompressed format. In order to deal with the potential data explosion within the pair gain system, safeguards may be put into place such as turning off compression at the modem level or disabling the decompression capabilities of the client-type modem 224 and ISP-type modem 228. Particular aspects of the modified network connection depicted in FIG. 4 are discussed further in conjunction with the detailed description of the pair gain system hardware depicted in FIG. 5.

Figure 5:
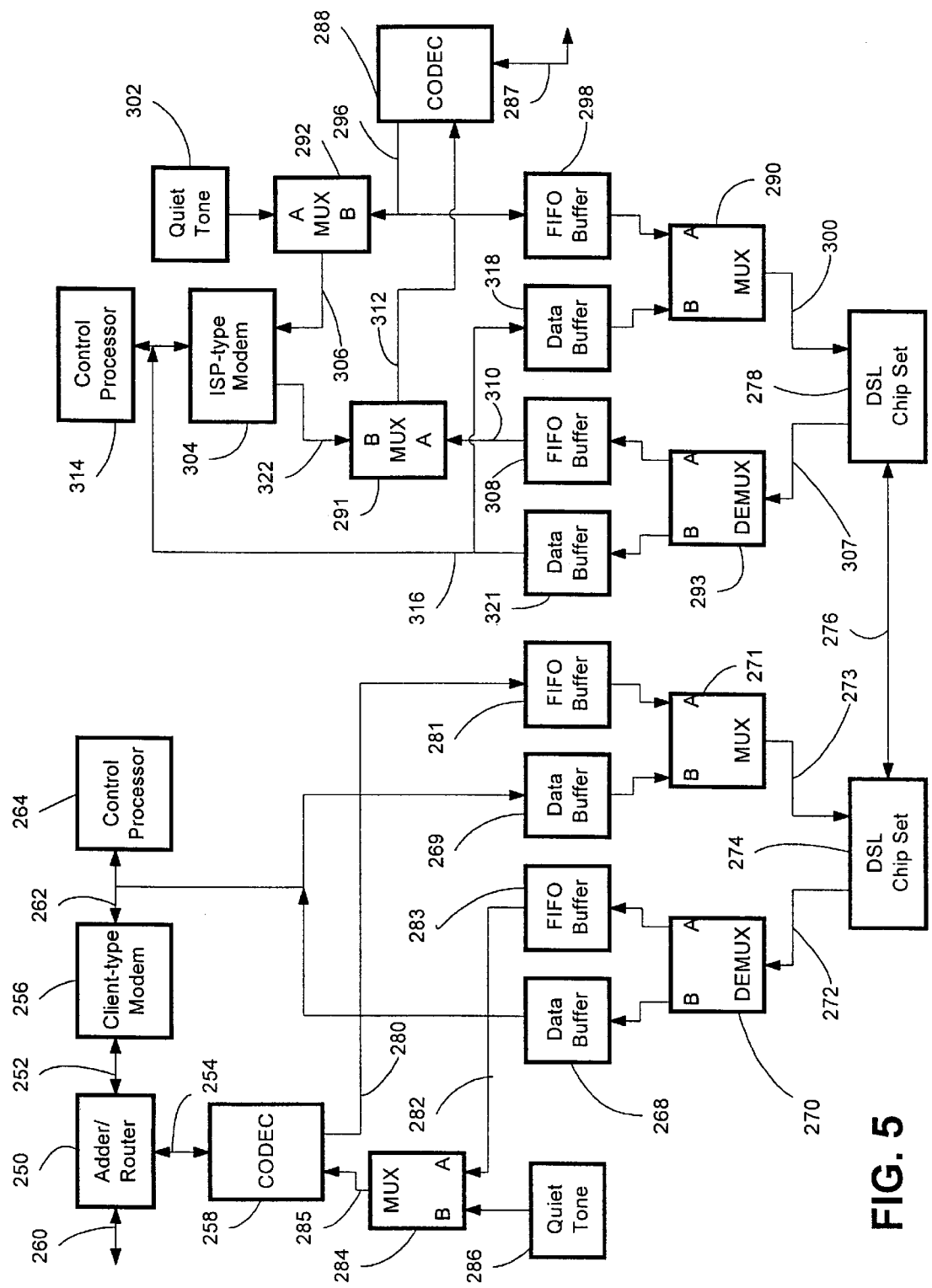
FIG. 5 is a mid-level schematic block diagram of the central office terminal including a client-type modem, and the remote terminal including an ISP-type modem in a network connection in accordance with the alternative embodiment depicted in FIG. 4.

Turning to FIG. 5, the adder/router 250 operates as previously described above in conjunction with FIG. 2. The adder/router 250 sums signals on lines 252 and 254 from a client-type modem 256 and a codec 258 respectively and renders an output signal on twisted pair line 260 to a central office switch. Signals received on line 260 from the central office switch are passed on line 252 to the client-type modem 256 (for modem data) and the codec 258 (voice calls). In contrast to the modem arrangement depicted in FIG. 2 where the client-type modem exchanges data with an ISP-type modem within the COT, the client-type modem 256 transfers data to/from the DSL interface circuitry (buffers and DSL chip sets) via the data bus 262 and control processor 264.

The control processor 264 communicates with the DSL interface circuitry via data bus 262. Data bus 262 terminates at data buffers 268 and 269. The buffers 268 and 269 are communicatively connected to DEMUX 270 and MUX 271 respectively which are selectively connected when the COT is configured for a modem data call (router circuitry position "B"). The DEMUX 270 and MUX 270 are connected via lines 272 and 273 to DSL chip set 274. DSL chip set 274 formats/un-formats data packets transmitted on twisted pair line 276 to/from a complimentary DSL chip set 278 for the RT side of the pair gain system.

Continuing with the description of the COT side of the pair gain system, position "A" is selected in the routing elements during a voice call. As a consequence, digitized voice information is transmitted on line 280 from the codec 258 to FIFO buffer 281. During the voice call, MUX 271 routes data from FIFO buffer 281 to the DSL chip set 274 via line 273. With regard to voice data received by the COT from the RT, voice data from DSL chip set 274 is routed by DEMUX 270 to FIFO buffer 283. Line 282 carries digitized voice information from the FIFO buffer 283 to a MUX 284. The MUX 284 passes the digitized voice data to the codec via line 285.

During modem data calls, the routing circuitry is switched to the "B" inputs. The resulting signal routing will be apparent to those skilled in the art based upon the circuit depicted in FIG. 5. It is noted that the "B" input of MUX 284, connected to a quiet tone generator 286, is selected during modem data calls to ensure that an output on line 254 from the codec 258 does not interfere with the data transmission signal received by the adder/router 250 on line 252 from the client-type modem 256.

In contrast to the COT side, all analog signals passing between a subscriber phone/modem and the RT on lines 287 are encoded/decoded by codec 288. The routing circuitry on the RT side of the pair gain system includes three MUXs 290, 291, 292 and a DEMUX 293. During a voice call, the routing circuitry is configured to pass the signals on the "A" input/output. During a modem data call, the routing circuitry selects the "B" input/output. Thus, during a voice call, received voice transmissions are transmitted on line 296 to FIFO buffer 298. The output of FIFO buffer 298 is received by the MUX 290 and passed to DSL chip set 278 via line 300. During a voice call, MUX 292 passes a quiet tone from the quiet tone generator 302 to an ISP-type modem 304 via line 306. The quiet tone does not affect any of the voice signal transmissions. During a voice call, DSL chips 278 transmit encoded voice information on line 307 to the DEMUX 293. The DEMUX 293 routes the encoded voice data to the FIFO buffer 308. The output of FIFO buffer 308 is transmitted on line 310 to MUX 291. MUX 291 passes the digitized voice data via line 312 to the codec 288. The codec 288 converts the digitized voice data to an analog signal and transmits the analog signal on the transmit wire of lines 287.

When a modem data call is placed, the routing circuitry selects the "B" lines. Therefore, during a modem data call, analog data received from a subscriber client modem via the receive wire of lines 287 is PCM encoded by the codec 288 and transmitted to the ISP-type modem 304 via MUX 292. The ISP-type modem 304 processes the PCM encoded data and provides the processed data to an RT control processor 314 via data bus 316. The RT control processor 314 transmits the data to a data buffer 318 via line 320. The encoded digital data passes via MUX 290 and line 300 to the DSL chips 278.

Also during a modem data call, the DSL chips 278 extract PCM encoded data from DSL data frames received from the COT via lines 276. The PCM encoded data passes from the DSL chips on line 307, through DEMUX 293, and into a data buffer 321. The encoded data is then passed via data bus 316 to the control processor 314. The encoded data is processed in preparation for submitting the data to the ISP-type modem 304. The ISP-type modem 304 processes the data in accordance with an established transmission protocol such as V.90 and then transmits the processed data via line 322 to MUX 291. MUX 291 transmits the data via line 312 to the codec 188.

Figure 6:
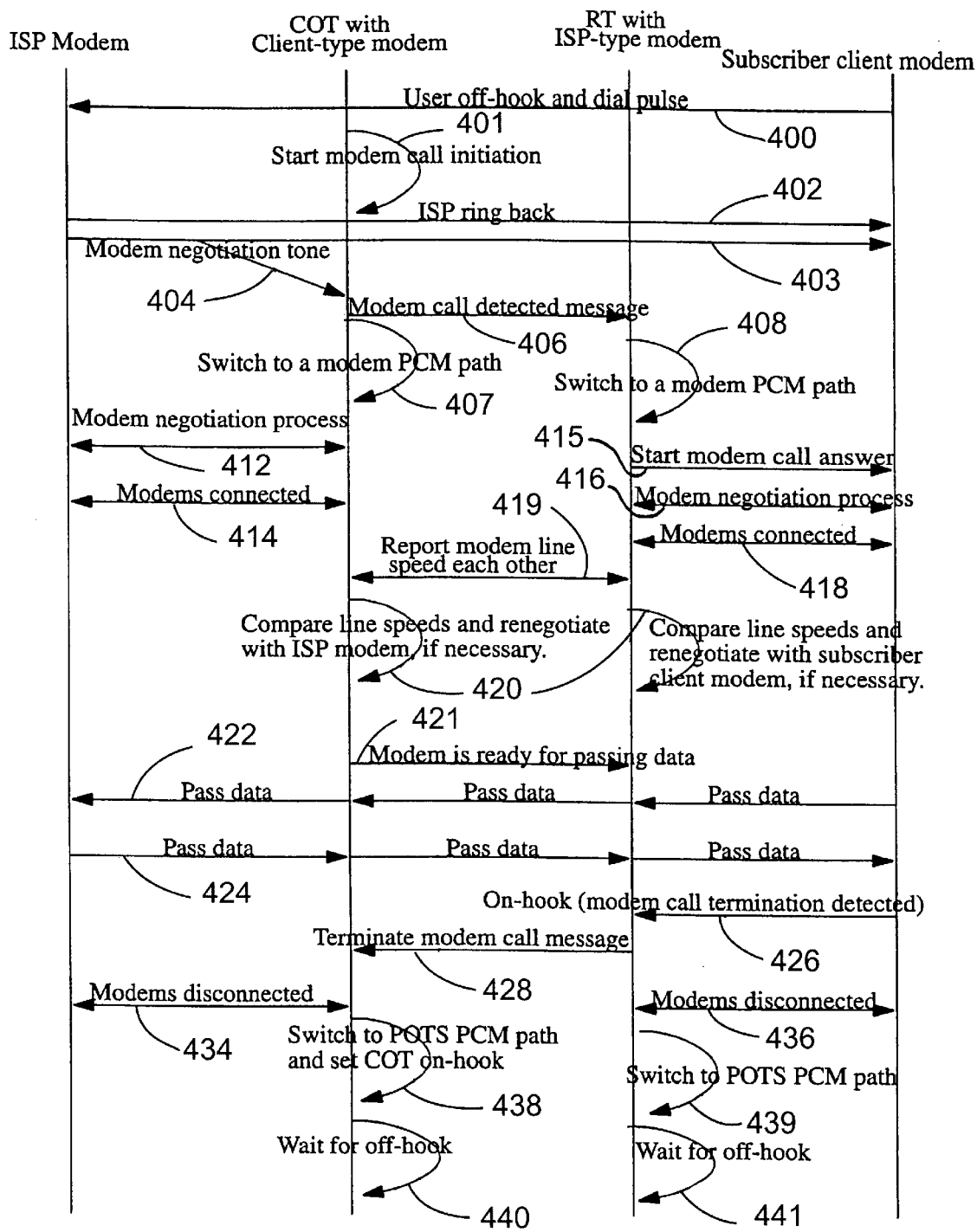
FIG. 6 is a stage/timing diagram of the start-up, operation, and shut down of a session between an ISP modem and a client modem in a network having a connection of the type depicted in FIG. 4.

Turning now to FIG. 6, a timing/stage diagram depicts the start-up, data transmission, and disconnection procedures performed by the apparatuses depicted in FIG. 4. At stage 400 the user modem off hook state is detected and dial pulses from the subscriber client modem 40 are carried via the analog call path through the upstream transmission path from the subscriber client modem 40 to the ISP modem 12. At stage 401 the control processor 225 in the COT 223 initiates modem call procedures in the client-type modem 224. In response to a successful dial sequence, during stage 402 a ring-back is returned by the phone company central office switch assembly 16 to the subscriber client modem 40 via the analog call paths through the COT 223 and RT 236. At stage 403 the ISP modem 12 answers and a negotiation tone from the ISP modem 12 is passed via the voice path through the COT 123 and onto the subscriber client modem 40.

At stage 404 the ISP modem 12 negotiation tone is sensed by the client-type modem 224. In response, at stage 406 the client-type modem 224 reports to the control processor 225 that it has detected a modem negotiation tone from the ISP modem 12, and the control processor 225 sends a message to the RT 236 that a modem call has been detected. At stages 407 and 408, the control processors 225 and 235 switch their routing circuitry to the modem data path "B" (cutting off the negotiation tone from downstream modems). During stage 412, the client-type modem 224 and ISP-type modem 12 negotiate the transfer protocol and maximum data rate to be used for downstream and upstream data transmissions. The presently preferred default protocols are V.90 downstream and V.34 upstream that have a maximum data rate of 56 Kbps and 36.6 Kbps respectively. At stage 414, the negotiation is completed, the client-type modem 224 has established a connection to ISP modem 12 and reports the downstream and upstream line speeds to the control processor 25.

Concurrently with the modem set-up process by the COT 223, the RT 236 performs its own set of procedures to establish a connection with the subscriber client modem 40. After starting a modem call answer at stage 415, at stage 416 the ISP-type modem 228 and the subscriber client modem 40 carry out their own protocol and data rate negotiation, and at stage 418 a connection is established between the ISP-type modem 228 and the subscriber client modem 40. At stage 119, the COT 223 and RT 236 report downstream and upstream line speeds to each other.

As mentioned above, in the preferred embodiment, the line speeds between all modems are equalized to lessen the chances that a bottleneck will arise in the transmission path. If the line speeds are not equal, at stage 420 the control processor(s) 225, 235 issue a command, or commands to the appropriate modem(s) to cause the modems to re-negotiate line speed at the slower of the reported line speeds for both downstream and upstream transmissions. At stage 421, the COT communicates with the RT to indicate that the COT is ready to pass data.

Thereafter, stages 422–424 represent the bi-directional data streams that are supported after the modems have been trained, and retrained if necessary to synchronize on a single set of upstream and downstream data rates. When the user is finished, at stage 426 the RT 236 detects that subscriber client modem 40 has hung up and in response issues an end modem call message to the COT 223 at stage 428. Of course a similar process is performed if the ISP modem 12 hangs up to initiate a disconnect procedure. On the ISP modem 12 side, at stage 434 the ISP modem 12 and client type modem 224 end the phone call and disconnect. On the subscriber client modem 40 side, at stage 436 the ISP-type modem 228 and subscriber client modem 40 end the phone call and disconnect. Thereafter, at stage 438 the control processor 225 switches the routing circuitry within the COT 223 to the analog call position "A" and the COT 223 is set to on-hook. During stage 439 control processor 235 switches the routing circuitry within the RT 236 to the analog call position "A". Finally, at stages 440 and 441 control processors 225 and 235 respectively enter a wait state for sensing off-hook.

In accordance with yet another embodiment of an apparatus for improved data transmissions on telephone links between service providers and remote clients, a central office terminal includes a floating client-type modem having a dynamically configurable, multiplexed connection to one of a plurality of input lines associated with corresponding POTS channels. If available, the floating client-type modem is inserted into a signal path between an ISP modem and a POTS channel for a subscriber client modem. At the completion of a session, the floating modem is withdrawn from the signal path and is made available to a next requesting POTS channel.

Figure 7:
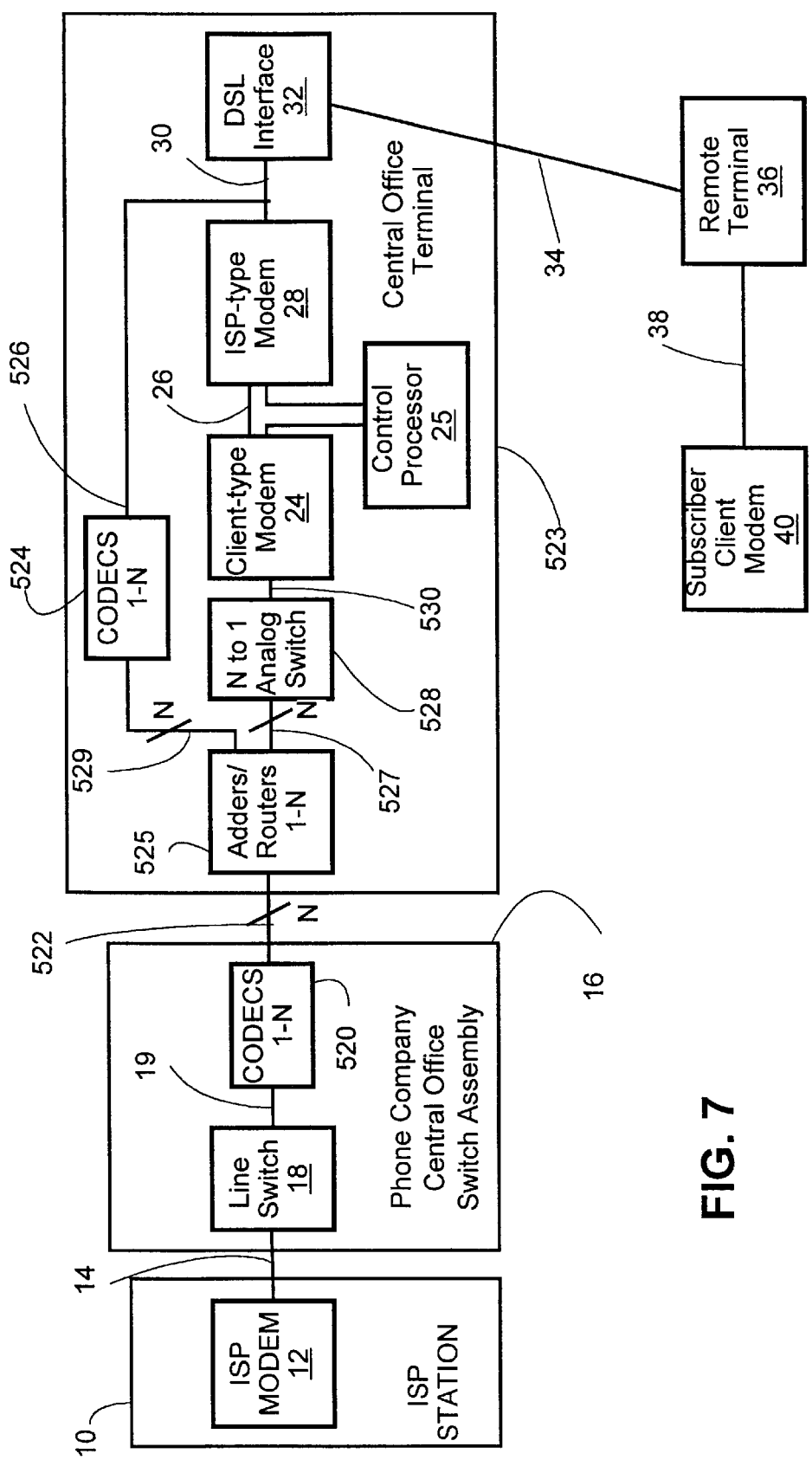
FIG. 7 is a high level schematic block diagram identifying the primary components of a connection between an ISP modem and a subscriber client modem in accordance with an exemplary embodiment of the present invention.

Turning now to FIG. 7, a high level schematic drawing is provided of a connection between the ISP modem 12 and the subscriber client modem 40 in accordance with an embodiment of the present invention. In contrast to FIG. 1, the COT 523 includes an N to 1 bi-directional analog switch, 528 having N inputs, corresponding to a set of N input lines 522 selectively routed through adders/routers 1-N 525 and received by the bi-directional analog switch 528 via lines 527. It is noted that while the preferred embodiment of the present invention utilized an analog switch for the bi-directional analog switch 528, in alternative embodiments of the invention, a bi-directional digital switch may be used to selectively route digital signals between the phone system central office 16 and a premium line service.

In the present example, a single floating client-type modem is connectable to one of "N" POTS channels. In other embodiments of a COT having a floating modem, "M" floating client-type modems are available for selective connection to the "N" POTS channels. Thus, in accordance with the floating modem aspect of the present invention, "M" floating modems are dynamically configured to serve "N" POTS channels, and the value N is greater than M. In view of the reality that only a fraction of all customers wish to use the high performance connection through a client-type modem in the COT, the floating modems facilitate reducing the cost of providing high performance connections to customers via the attached POTS lines.

Figure 13:
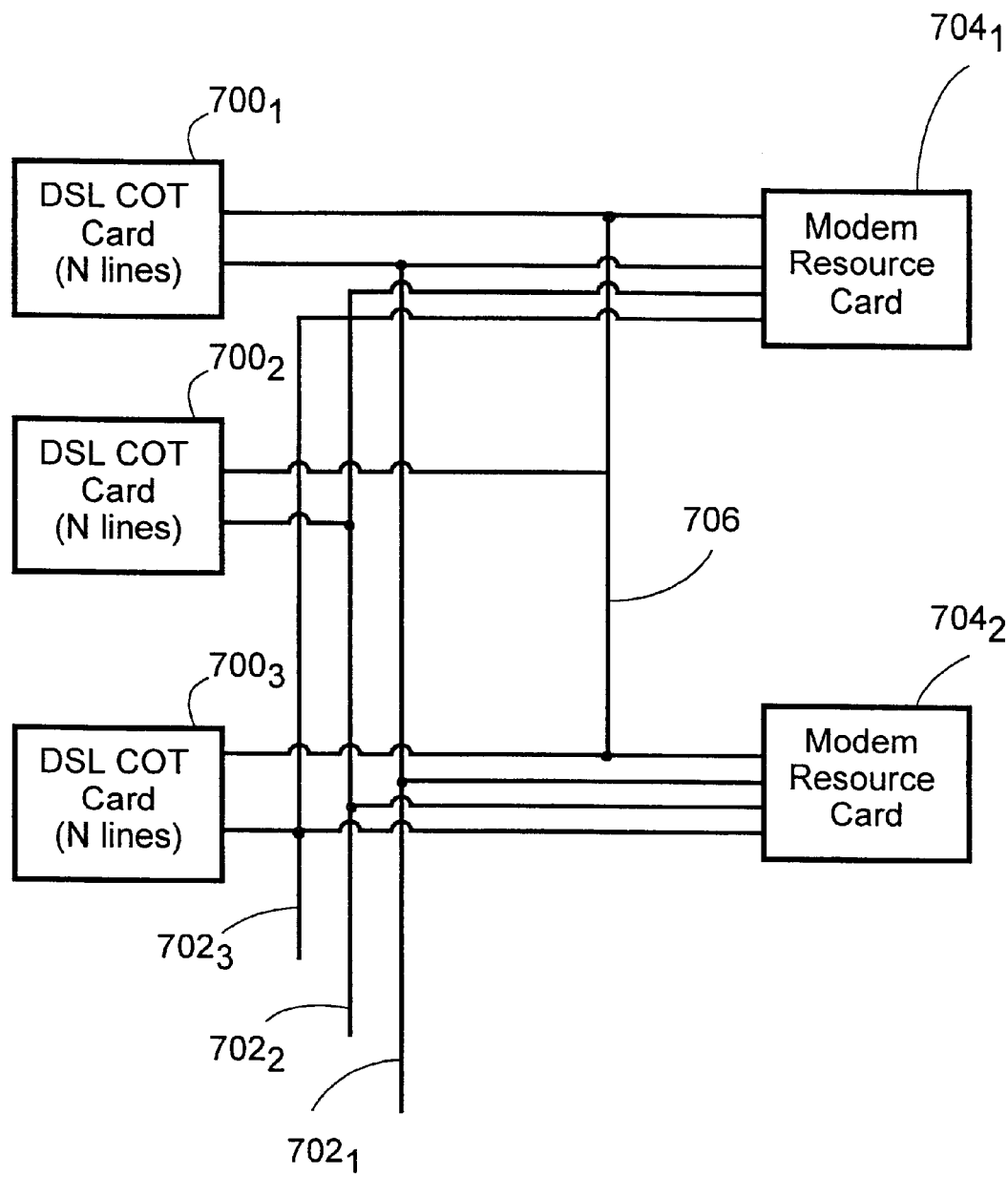
FIG. 13 is a high level schematic diagram depicting the present invention in an embodiment of the present invention comprising a pool of floating client-type modems.
Figure 14:
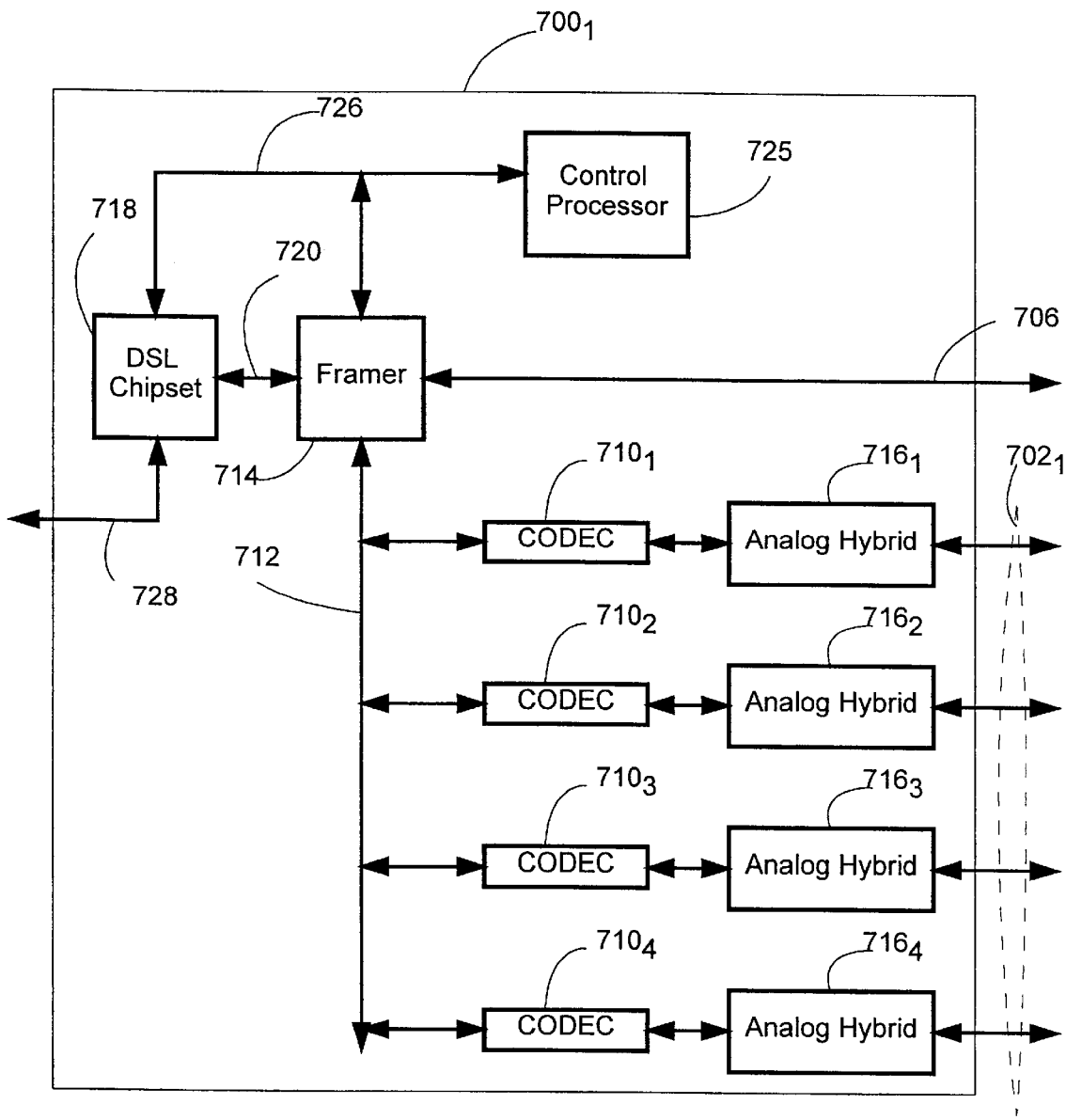
FIG. 14 is a schematic diagram depicting components within a COT card in the embodiment of the present invention depicted in FIG. 13.
Figure 15:
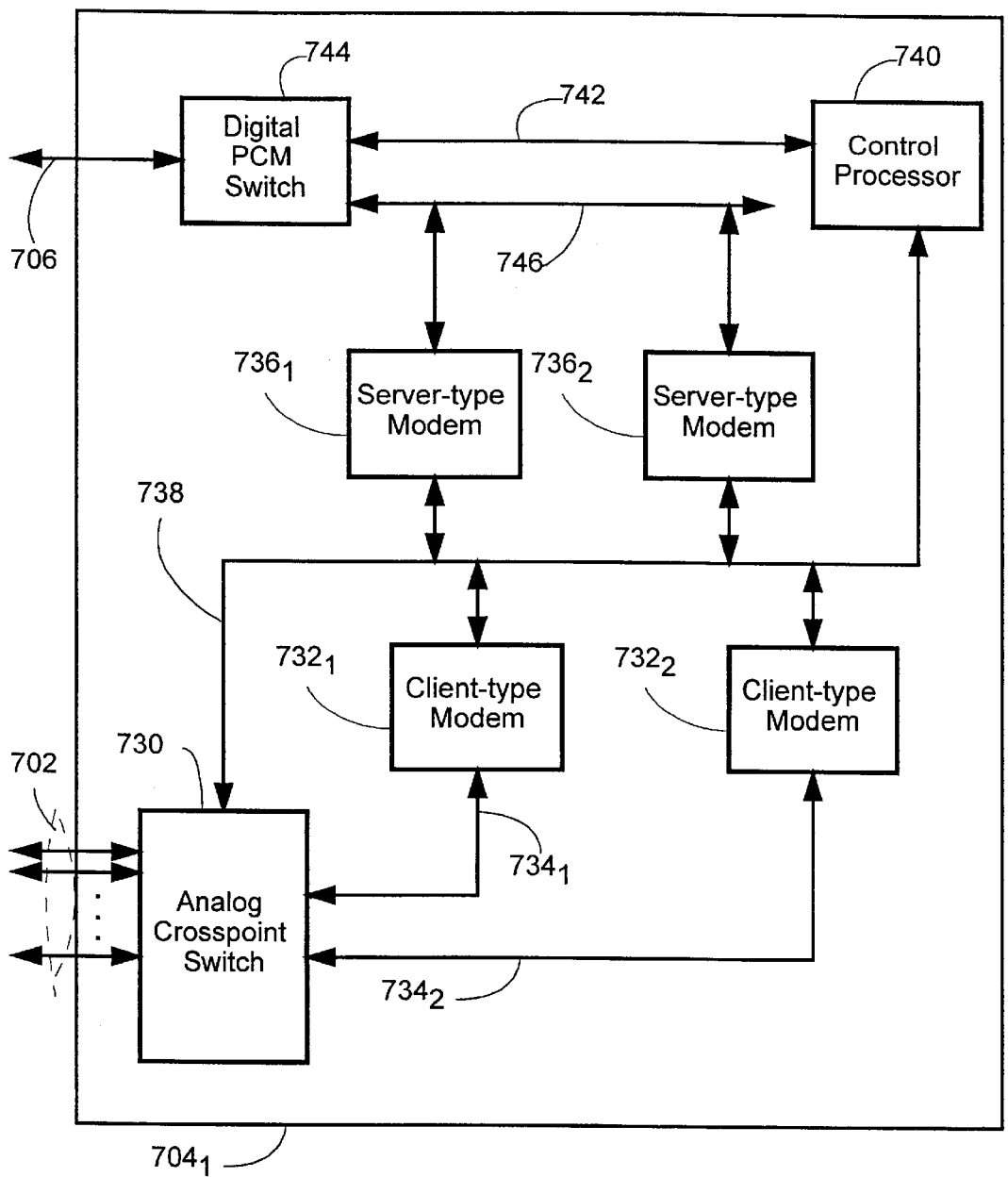
FIG. 15 is a schematic diagram depicting components within a floating modem resource card in the embodiment of the present invention depicted in FIG. 13.

Taken a step further, the floating modem configuration is extended over a set of central office terminals in a central office installation (e.g., a shelf or rack of central office terminal cards) comprising multiple COT's. In such an installation, a set of premium line service paths are provided by a floating modem pool which comprises replicas of the premium line service path depicted in FIG. 7. However, rather than residing within a single COT board, the pool of premium line service paths are shared by an entire installation of COT's. In such an instance, every one of the POTS lines of a single COT may be granted simultaneous access to the premium line service even though the ratio of available premium lines to standard lines is, for example, one premium line for every four standard lines. This embodiment is depicted in FIGS. 13–15 and described herein below.

Figure 8:
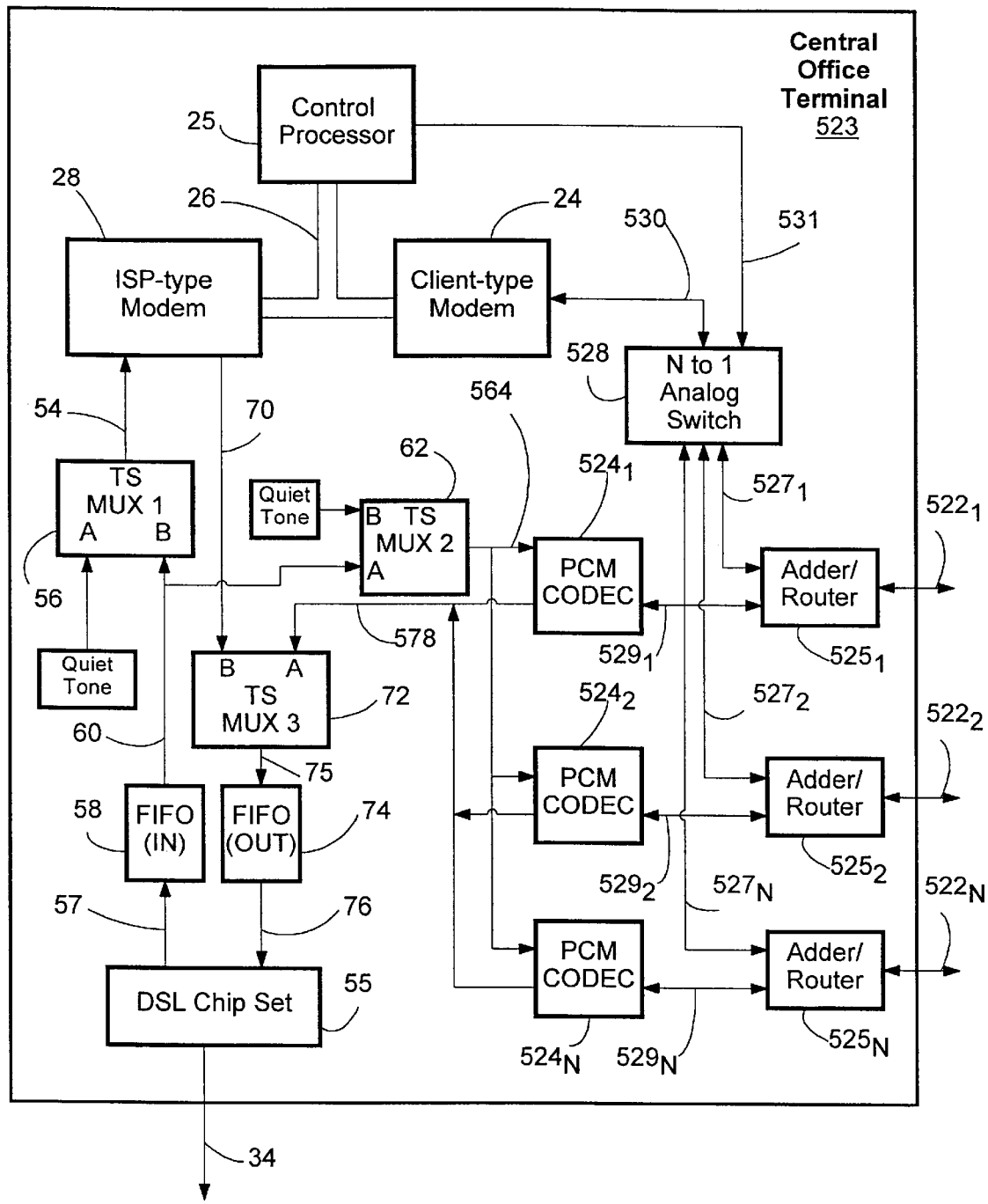
FIG. 8 is a mid-level schematic block diagram of the central office terminal including client-type and ISP-type modems in the exemplary embodiment depicted in FIG. 7.

With specific reference to FIG. 7, as previously employed with regard to FIG. 4, same numbers are used to identify similar components from the description of FIG. 1, new reference numbers indicate new or modified structures. Rather than repeat the discussion of the unchanged portions of the block diagram provided above for FIG. 1, attention will be directed to the modified portions of the drawing. FIG. 7 explicitly depicts a set of N PCM codecs 520 communicatively coupled by a set of N twisted pair lines 522 to an analog interface of a COT 523. Each one of the lines of the set of N twisted pair lines 522 is selectively connected, through the adders/routers 525 and via lines 529, to a corresponding one of a set of N PCM codecs 524. Lines 526 carry signals between the set of N PCM codecs 524 and the DSL interface 32. The details of the connections between the N PCM codecs 524 and the DSL interface 32 are depicted in FIG. 8 and described herein below.

The set of N PCM codecs 524 perform voice transmission quality A/D and D/A PCM conversions. Such conversions are of sufficiently high quality to reliably transport V.34 modem data signals between an ISP modem and a subscriber client modem. However, the set of N PCM codecs 524 are incapable of reliably reproducing V.90 modem data signals at the highest data rate (approximately 50 Kbps).

As previously explained above with reference to FIG. 1, V.90 modem data transmissions are directed to the client-type modem 24 which performs a synchronous, high precision analog to digital conversion of one of the lines 522 selected by an N to 1 bi-directional analog switch 528 according to control signals (not explicitly depicted) from the control processor 25. Line 530 connects the selected signal from the lines 522 to the client-type modem 24. The remaining portions of FIG. 7 operate/function according to the previous description of the like-numbered components described herein above.

The exemplary connection depicted in FIG. 7 includes only the single analog N to 1 bi-directional analog switch 528 and a single client-type modem 24. However, in other embodiments of the present invention M copies of the bi-directional analog switch 528 and client-type modem are provided (where M is less than N). This enables signals on up to M of the set of N lines 522 to be simultaneously routed to the M client-type modems. For example, in an embodiment of the invention eight lines from the central office switch assembly 16 are selectively routed to an available one of a pool of two client-type modems. This results in providing V.90 access to eight potential users without incurring the hardware cost of eight sets of relatively expensive client-type modems.

An added feature of multiplexed access to the client-modem 24 is the ability to instruct the central office terminal 523 to limit access to the "premium" service provided by the client-modem 24 connection path to certain ones of the lines 522 associated with particular phone system customers. For example, in a central office terminal serving 8 distinct customer connections on lines 522, if the customers corresponding to lines 1 and 2 have not subscribed to the premium service and those corresponding to lines 3–8 have subscribed, then the N to 1 bi-directional analog switch 528 is controlled by the control processor 25 and/or other control hardware to allow only lines 3–8 to be routed to the client-modem 24.

Turning to FIG. 8, a mid-level schematic block diagram depicts the central office terminal including client-type and ISP-type modems in the ISP modem/subscriber client modem connection depicted in FIG. 7. The following written description will address the structures in FIG. 8 which were not previously depicted and described with reference to FIG. 2. Again, like numbered structures in FIGS. 2 and 8 refer to like or substantially similar structures.

Before describing the new structures, it is noted explicitly that each of the MUXs 56, 62 and 72 are time slot multiplexed. In the present example, the pair gain line 34 between the COT 523 and the RT 36 supports up to N distinct simultaneous calls. Internally, after the analog signals are converted to digital format, they are transmitted in time dedicated time slots. The use of the line 34 is divided into N time slots each transmission period. Therefore, control lines (not shown) from the control processor 25 control each of the MUXs 56, 62 and 72 on a time slot basis.

Lines 522 (1 to N) transport signals between the central office switch assembly 16 and a set of N adders/routers 525 (1 to N). The set of adders/routers 525 (1–N) are connected to the N to 1 bi-directional analog switch 528. The bi-directional analog switch 528 selectively connects one of a set of N lines 527 (1–N) to line 530. The choice of line in the bi-directional switch 528 is controlled by line 531 from the Control Processor 25. While line 531 is shown as a single line, those skilled in the art will readily appreciate that this is a multiple bit address signal from a register for selecting one of the N input lines to the analog switch. The register output is controlled by known data/address/chip select control signals from the Control Processor 25. Line 530 provides the signal path between the client-type modem 24 and the bi-directional analog switch 528.

Only one of the lines 522 is coupled to the client-type modem 24 at any given time. A set of N lines 529 (1–N) communicatively couple the input/output interface of the adders/routers 525 (1–N) to respective ones of a set of N PCM codecs 524 (1–N). Signals are received by the set of N PCM codecs 524 (1–N) from the multiplexer 62, on a time slot basis, via line 564 during normal voice quality phone calls. Signals are transmitted by the set of N PCM codecs 524 (1–N) to the multiplexer 72, on a time slot basis, via line 578. The remaining portions of FIG. 8 have been previously described with reference to FIG. 2 and will not be repeated here.

Finally, it is noted that with regard to alternative embodiments of the present invention, the number of lines routed to the superior signal processing circuitry by bi-directional analog switches to facilitate high speed modem connections may be greater than the single line provided by the hardware disclosed in FIG. 8. In such instances the number of analog switches is increased to facilitate selection of more than one line at a time. Additional time slot routing controls are provided to route signals between ISP-type modems and MUXs 56 and 72.

Figure 9:
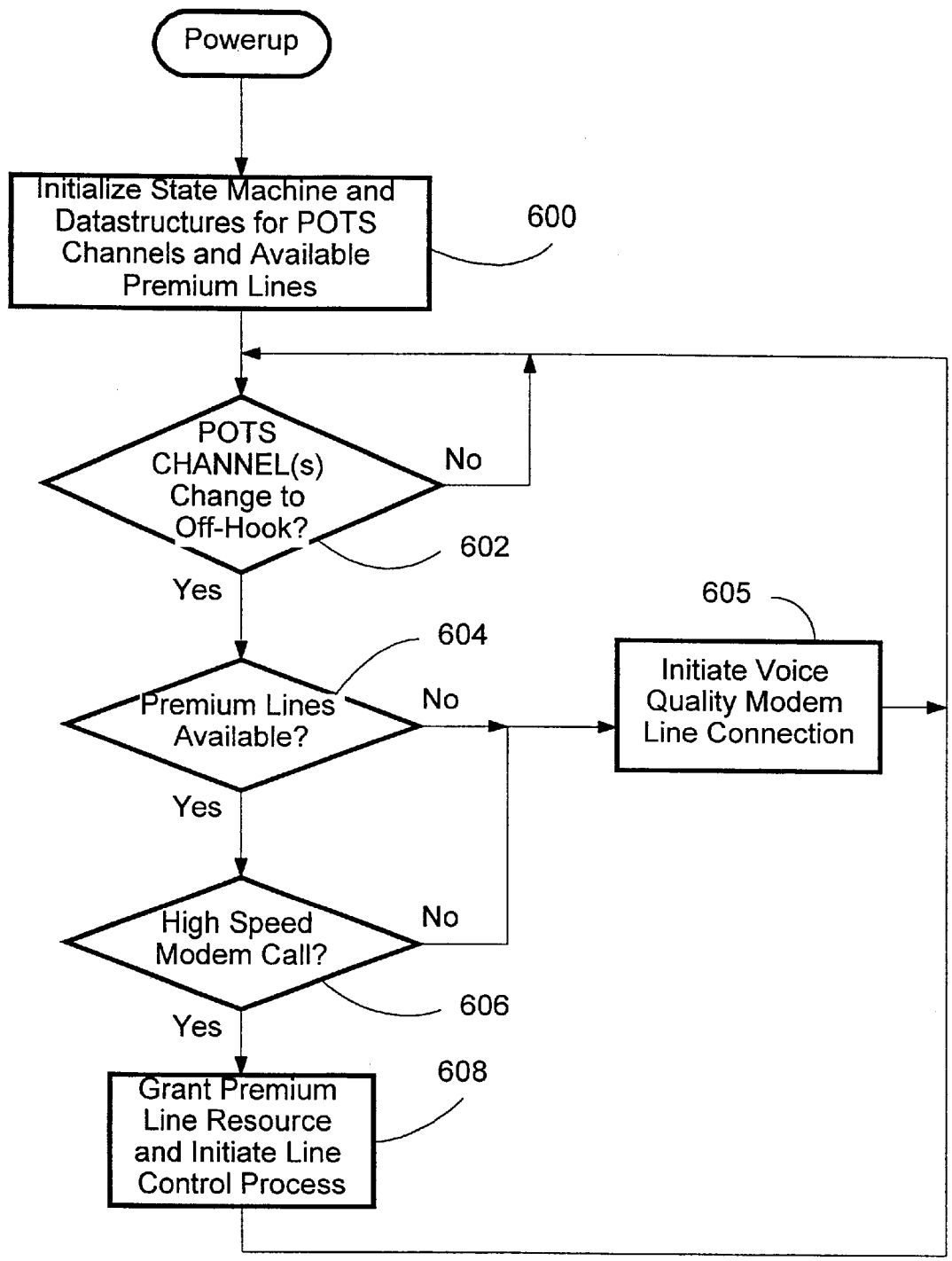
FIG. 9 is a flowchart summarizing the steps associated with a control processor allocating and de-allocating modem lines to phone line subscribers in accordance with an embodiment of the present invention.

Turning now to FIG. 9, a set of steps depict the actions and decisions performed by the control processor 25 of the COT 523 in order to carry out the present invention. After power up, at step 600 the control processor 25 initializes a token state machine (see FIG. 11) representing prior status of the POTS channels for receiving access to premium modem line service. Thus, the control processor determines which ones of the customer lines have subscribed to the premium modem line service. Alternatively, the premium line service priority can be made available to all lines regardless of whether the customers have requested premium modem line service. Priority tokens are not essential to carry out the present invention, but will be discussed further below in conjunction with FIGS. 11 and 12. In any event, at the completion of step 600 the control processor has set up, for each client-type modem under its control, a token-based state machine including a number of states equal to the. number of lines that can be given priority for requesting use of a corresponding client-type modem within the COT 523.

Next, at step 602, the control processor 25 determines whether one or more POTS lines served by the pair gain system have transitioned to an off-hook state. If none of the POTS lines have transitioned to an off-hook state, then the processor 25 loops back to step 602 and repeats the off-hook transition step until an off-hook transition occurs. When such a transition occurs, control passes from step 602 to step 604. At step 604, the control processor 25 determines whether a premium modem line is available. If none is available, then control passes to step 605 wherein the control processor initiates a regular phone call connection for the requesting line, and control returns to step 602.

On the other hand, if at step 604 a premium modem line is available, then control passes to step 606 wherein the control processor determines whether the call requires the premium modem line. For example, if the call requires only a V.34 connection, and the signal quality is sufficient to enable the modems to communicate at the maximum rate for V.34, then there is no advantage to allocating the limited premium resources to that particular connection. In no: instance will a voice phone call be routed through the client-type modem. Therefore, if premium line service is not required or a voice phone call is being placed, then control passes to step 605.

Otherwise, if a premium line is available and needed to enable a modem to communicate at a high rate using the V.90 protocol (or other high speed protocol), then control passes to step 608. At step 608, the control processor grants access by the caller to the premium line and processes are activated to control appropriate switches and monitor the phone call for hang-up in accordance with the process briefly summarized in FIG. 10. At step 608, a token-based state machine is updated, if necessary, to reflect the grant of a premium modem line to a highest priority POTS channel. Control then returns to step 602 wherein the process waits for a next POTS channel to transition to an off-hook state.

Figure 10:
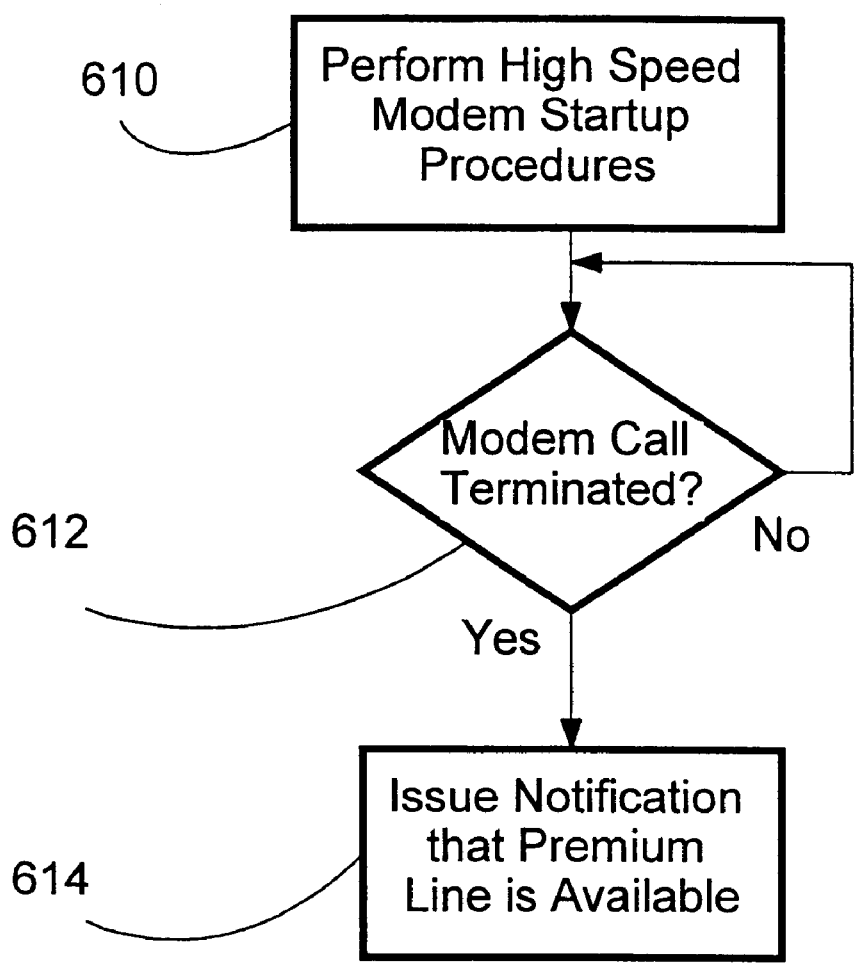
FIG. 10 is a flowchart summarizing the steps associated with a process or processes handling a premium modem connection.

Turning now to FIG. 10, the steps are summarized for a process spawned by the main process depicted in FIG. 9 when a premium line token is allocated to a requesting modem. When the process is created to handle a premium line, during step 610 the process initially performs control operations described herein with regard to FIG. 3 in order to establish a V.90 high speed modem connection between an ISP modem and subscriber client modem. After starting up, control passes to step 612 and the process monitors the call for termination. After the call is terminated and the control processor completes reconfiguring the analog switch hardware to disable the connection to the premium line, control passes to step 614 wherein the process returns the premium line token. Thereafter, the token state machine is updated to allocate the premium line to the next requesting modem.

In an embodiment of the present invention, after the token is returned and a premium line is made available to others, the control processor inserts a message into a modem session on a normal line for a POTS channel having the current highest priority. The message queries the user of the normal line whether the user would like to reconnect at the higher data rate made possible by the premium line. Such a case is considered the equivalent to detection of an off-hook state at step 602 of FIG. 9. If the modem user accepts the offer to upgrade the line connection, then the line is switched and reconnection is established through the premium line connection as described above with reference to FIGS. 3 and 9.

Figure 11:
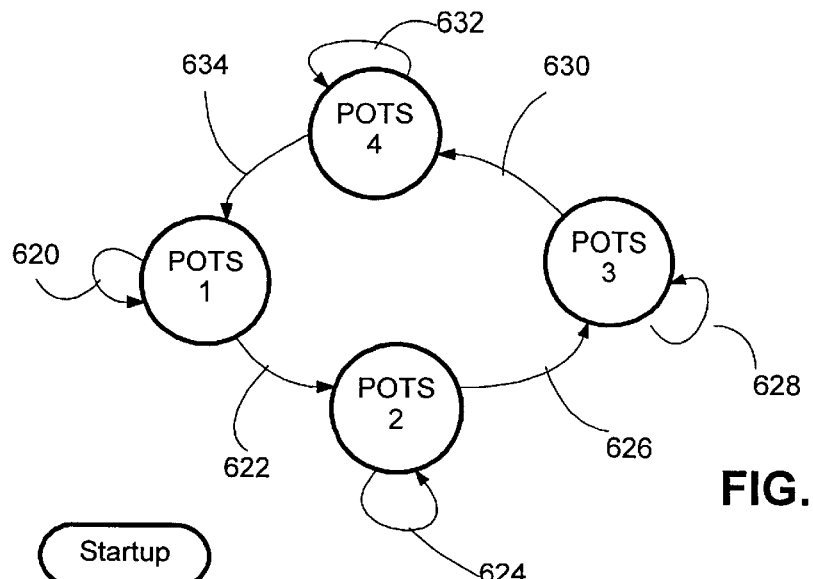
FIG. 11 is a state diagram depicting the operation of the token granting scheme in accordance with an embodiment of the present invention.

Turning briefly to FIG. 11, an exemplary token state machine is provided for four POTS channels sharing a single premium line token. At startup, the state machine enters a POTS 1 state and remains at that state (edge 620) until POTS 1 requests the premium line and receives the premium line. When the premium line is allocated to the POTS 1 channel, control passes on edge 622 to a POTS 2 state. Control loops on edge 624 until the POTS 2 channel requests and, receives the premium line. Control passes on edge 626 to a POTS 3 state. The state machine remains at POTS 3 (edge 628) until the POTS 3 channel has received the premium line. Control then passes on edge 630 to a POTS 4 state. After looping on edge 632, control returns on edge 634 to the POTS 1 state and the process repeats.

The state machine depicted in FIG. 11 provides a circulating priority scheme. It is intended to resolve simultaneous requests. It will not prevent a POTS channel from acquiring a token notwithstanding the fact that it has not achieved top priority. However, a particular POTS channel may fail to request the premium channel for a period of time. In such instances, rather than block upon the non-requesting POTS channel, control passes to a next POTS state after the expiration of a time period. For example, if the POTS 3 channel does not request the token when control passes to a POTS 3 state, then control passes on edge 628 to a POTS 4 state upon expiration of the time period.

The state machine does not represent ownership of the premium line. For example, if the premium line token is given to the POTS 4 channel when POTS 1 has the token, then the token remains at the POTS 1 state. In an alternative embodiment of the invention, the state machine represents the present owner of the premium line and the next state represents the highest priority POTS channel. If a POTS channel is not waiting to use the premium line at the time the state machine enters the corresponding POTS state, then control passes to the next POTS state.

Finally, with regard to the aforementioned alternative to the state machine depicted in FIG. 11, it is noted that multiple replicas of state machines are constructed for systems including multiple premium lines. In such instances, the state machines are created by the control processor 25 and are separately updated based upon the allocation and return of each state machine's respective token.

Figure 12:
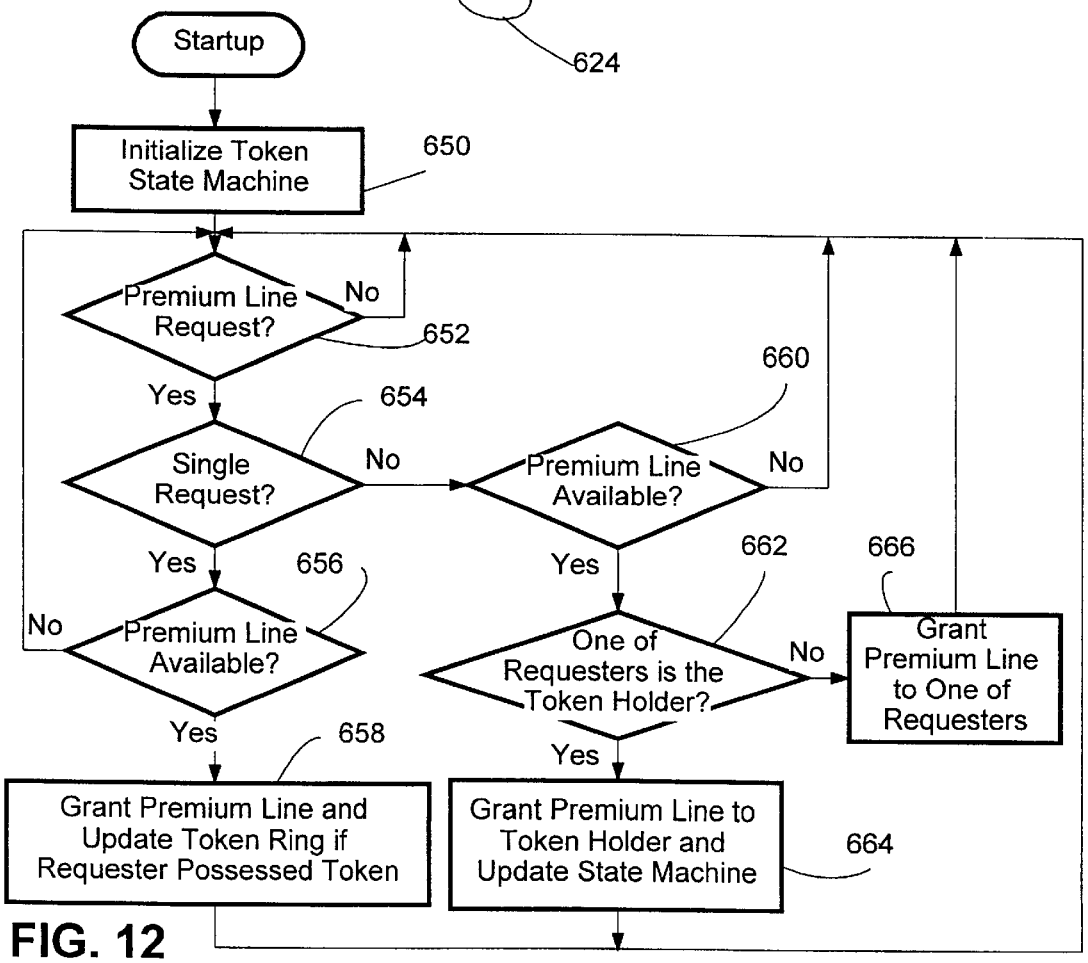
FIG. 12 is a flowchart summarizing the steps associated with a control processor allocating access to premium line connections and maintaining a state machine representing access priority for POTS channels in the event of request conflicts.

Turning now to FIG. 12, the steps are summarized for transitioning between states and handling simultaneous requests for a premium line in accordance with a preferred embodiment of the present invention. After startup, at step 650 a token state machine (e.g., FIG. 11) is initialized based upon the existence of POTS channels which may seek to connect using the premium line connection. Next, at state 652 the process loops until a request for the premium line is sensed (from any of the POTS channels). Control passes to step 654 wherein the process determines whether a single request has been received. If a single request is received, then control passes to step 656. At step 656 if the requested premium line is not available, then control returns to step 652. Otherwise, if the requested premium line is available, then control passes to step 658 wherein the requesting POTS Channel is granted the premium line. In accordance with the above described state machine, the priority token is passed to the next POTS channel only if the POTS channel that received the premium line was the present holder of the token. Control then returns to step 652.

If, at step 654 multiple simultaneous requests have been received for the premium line, then control passes to step 660. If at step 660, the premium line is not available, then control returns to step 652. Otherwise control passes to step 662 wherein the process determines whether one of the requesting POTS channels is the present holder of the priority token. If one of the requesters is the holder of the priority token, then control passes to step 664 the process grants the premium line to the POTS channel corresponding to the token holder and passes the token to the next POTS channel. Control then returns to step 652. Otherwise, if at step 662 none of the requesters holds the priority token, then control passes to step 666 and one of the requesters is given the premium line. The token location is not updated, and control returns to step 652.

The floating premium line embodiment of the present invention has been described with regard to a COT 523 containing both the client-type and ISP-type modems. However, like the alternative embodiment of FIG. 1 depicted in FIG. 4, in an alternative embodiment of the present invention, the floating premium line is applied to a system of the type shown in FIG. 4. In that embodiment, additional switch circuitry is added to route modem data signals to one or more ISP-type modems associated with the premium line connection(s).

Turning now to FIG. 13, a high-level schematic diagram depicts a COT installation embodying yet another embodiment of the present invention wherein a pool of modems selectively transmit data signals between any one of the analog POTS lines served by the COT installation, and a corresponding COT DSL interface. In general, a COT installation includes a set of "P" COT DSL cards, and each COT DSL card is communicatively coupled to "N" POTS Analog signal lines. In the specific embodiment depicted in FIG. 13, P equals 3 and N equals 4. However, in alternative embodiments of the invention, the values of P and N vary in accordance with the needs and capabilities of the hardware and software of a particular installation. The COT installation depicted in FIG. 13, a shelf, contains a set of three (3) DSL COT Cards 700 (1–3). Each of the three (3) DSL COT cards 700 is communicatively coupled to a set of four (4) POTS analog signal lines 702 (1–3). Thus, the values of P and N are three (3) and four (4), respectively, in the embodiment disclosed in FIG. 13.

In the illustrative embodiment of the present invention set forth in FIG. 13, each of the analog signal lines 702 is also connected to each one of a set of two modem resource cards 704 (1–2). The modem resource cards each contain a set of two client-type modems providing a total of two premium line connections per modem resource card. The number of modem resource cards (R) and the number of client-type modems (M) within each modem resource card may be altered without departing from the spirit of the present invention. Thus, in general, the modem resource cards 704 provide simultaneous premium line access to up to R times M (e.g., 4) of the P times N (e.g., 12) POTS analog signal lines 702.

With continued reference to FIG. 13, a data/control PCM bus 706 communicatively couples the modem resource cards 704 to the DSL COT cards 700. Data/control PCM bus 706 carries data transmitted between the DSL COT cards 700 and the modem resource cards 704 in accordance with line selection logic described below with reference to FIG. 15. The data/control PCM bus 706 also carries signals needed to selectively connect and synchronize data communications between the modem resource cards 704 and the DSL COT cards 700.

Finally, it is noted that with regard to FIG. 13 that a variation of the illustrative embodiment of the present invention may be implemented wherein fewer than the complete set of POTS analog lines are connected to each of the modem resource cards 704. For example, in an alternative embodiment each of the analog lines may be connected to two of three available modem resource cards.

FIG. 14 schematically depicts the primary functional blocks for one of the DSL COT cards 700. The DSL COT card 700(1) has been selected for purposes of describing the embodiment of the present invention depicted in FIG. 13. As previously discussed in the embodiment depicted in FIG. 8, the DSL COT cards 700 include a set of four bi-directional codecs 710 (1–4). Each one of the four (N=4) bi-directional codecs 710 is connected to a time division multiplexed bus 712 which carries signals between the bi-directional codecs 710 and a framer 714. The framer 714 comprises the multiplexer and buffer circuitry previously depicted in detail in FIG. 2. The four bi-directional codecs 710 transmit and receive analog signals to POTS analog signal lines 702(1) via analog hybrids 716(1–4). The analog hybrids 716(1–4) have substantially the same circuitry as the adder/router 50 previously discussed with reference to FIG. 2. As those skilled in the art will readily appreciate, the analog hybrids 716(1–4), in a known manner, are capable of combining received signals and transmitting analog signals onto a single twisted pair while simultaneously listening for signals received on analog signal lines 702. This enables the analog signal lines to simultaneously carry both transmitted and received signals. This enables the COT's to discern received signals while simultaneously transmitting a signal on the same twisted pair line. The analog hybrids 716(1–4) differ from the adder/router 50 in that they do not combine analog signals received from a codec and a client-type modem.

Data is communicated between the framer 714 and a DSL chipset 718 via lines 720. The operation of both the framer 714 and the DSL chipset 718 is controlled by control processor 725 via control bus 726. Finally, the COT DSL card 700(1) communicates with a communicatively coupled RT via twisted pair line 728.

FIG. 15 schematically depicts the primary functional blocks for one of the modem resource cards 704(1). The analog POTS lines 702 are connected for bi-directional communication to an analog crosspoint switch 730 under the control of signals from a control processor 740 on control/data bus 738. The crosspoint switch 730 routes signals between any one of the POTS lines 702 and the client-type modems 732(1–2) via lines 734(1–2). As those skilled in the art will readily appreciate, the crosspoint switch 730 includes circuitry (not specifically shown in the drawings) which, in a known manner, enable the crosspoint switch 730 to transmit analog signals onto a twisted pair (lines 734) while simultaneously listening for, and discerning, signals received from client-type modems 732 on those same lines. This enables the analog signal lines 734 to simultaneously carry both transmitted and received signals between the crosspoint switch 730 and the client-type modems 732.

While the connections between the crosspoint switch 730 and client-type modems 732(1–2) include dedicated physical lines, in alternative embodiments such connections may comprise dedicated channels that are either time or frequency multiplexed. Indeed such a choice is applicable to most, if not all, of the lines depicted in the illustrations of preferred embodiments of the present invention.

The client-type modems-type 732(1–2) communicate with corresponding server-type modems 736(1–2) via data/control bus 738 and control processor 740. While the data is presently transferred between the client-type modems 732 and server-type modems 736 with intermediate buffering within the control processor 740, other embodiments may perform direct transfers between the client-type modems 732 and server-type modems 736. Digital data is transmitted between the server-type modems 736 and the COT cards 700 via a digital PCM switch 744. The digital PCM switch 744 is control by lines 742 from the control processor 740. The digital PCM switch 744 communicates data with the server-type modems 736 via data bus 746.

Illustrative embodiments of the present invention and certain variations thereof have been provided in the Figures and accompanying written description. The present invention is not intended to be limited to these embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A data transmission path on a telephone network from a service provider modem to a subscriber client modem comprising:
    a server station including the service provider modem, wherein the service provider modem is configured to transmit a data signal;
    a central office switch assembly, including a line switch and a set of codecs, communicatively coupled to the server station to receive the data signal, wherein the set of codecs is configured to transmit first encoded analog data signals including analog data signals corresponding to the data signal;
    a decoder, proximate to and communicatively coupled to the central office switch assembly, configured to receive the first encoded analog data signal and extract from the first encoded analog signal a first recovered digital data set;
    an analog switch, interposed between signal lines from the set of codecs within the central office switch assembly and the decoder, to route signals received from a selected one of the set of codecs to the decoder;
    a server-type modem, communicatively coupled to the decoder, configured to receive a second digital data set corresponding to the first recovered digital data set, encode the second digital data set to render an encoded digital data signal, and transmit an encoded digital data stream representing the first recovered digital data set; and
    a subscriber client modem, communicatively coupled to the server-type modem, configured to receive a second encoded analog data signal corresponding to the first recovered digital data set.

2. The data transmission path of claim 1 further comprising:
    a second decoder configured to decode analog signals received from the central office switch assembly; and
    a second analog switch interposed between one of the set of codecs of the central office switch assembly and the decoder and second decoder, thereby establishing a first selectable transmission path through the decoder and a second selectable transmission path through the second decoder.

3. The data transmission path of claim 1 wherein a client-type modem includes the decoder.

4. The data transmission path of claim 3 wherein the server-type modem receives the second digital data set from a control processor which in turn receives data corresponding to the first recovered data set from the client-type modem.

5. The data transmission path of claim 1 wherein the server-type modem is proximate to the decoder.

6. The data transmission path of claim 1 further comprising a digital network transmission link interposed between the decoder and the subscriber client modem.

7. The data transmission path of claim 6 wherein the server-type modem is attached to the subscriber client modem side of the digital network transmission link.

8. The data transmission path of claim 1 wherein the encoder is located at a phone company central office.

9. The data transmission path of claim 8 wherein the decoder is proximate to a codec from which the first encoded analog data signal is transmitted.

10. A central office terminal, for a network transmission path including a server station including a service provider modem configured to transmit a data signal, and a central office switch assembly including a line switch and a set of codecs, communicatively coupled to the server station to receive the data signal, and wherein the set of codecs are configured to transmit analog data signals including a first encoded analog data signal corresponding to the data signal, the central office terminal comprising:
    a client-type modem, comprising a server side interface for communicatively connecting to a central office switch assembly, configured to receive the first encoded analog data signal and extract from the first encoded analog signal a first recovered digital data set;
    an analog switch, interposed between the central office switch assembly and the client-type modem and including a multiple line interface communicatively coupled to ones of the set of codecs and a single line interface to the client-type modem, to route signals received from a selected one of the set of codecs to the client-type modem; and
    a server-type modem, configured to receive a second digital data set corresponding to the first recovered digital data set, encode the second digital data set to render an encoded digital data signal, and transmit an encoded digital data stream representing the first recovered digital data set.

11. The central office terminal of claim 10 comprising:
    an N-line signal interface between the set of codecs from the central office switch assembly and a set of N central office terminal codecs;
    a set of M replicas of the client-type modem, wherein the values of N and M are positive integers and the value of M is less than N; and a set of M replicas of the analog switch, each signally coupled to a corresponding one of the set of M client-type modems, for routing input signals from a selected one of the N-line signal interface to a corresponding one of the M client-type modems.

12. A central office terminal, suitable for connection to a phone network central office switch assembly including a line switch and a set of codecs, wherein the set of codecs are configured to transmit and receive analog signals to the central office terminal via a set of corresponding lines, the central office terminal comprising:

a client-type modem, configured to receive a first encoded analog data signal originating from a selected one of the set of codecs and extract from the first encoded analog signal a first recovered digital data set;

an analog switch, interposed between the set of codecs and the client-type modem and including a multiple line interface communicatively coupled to ones of the set of codecs and a single line interface to the client-type modem, to route signals received from a selected one of the set of codecs to the client-type modem; and a data transmission interface, configured to receive a data set corresponding to the first recovered digital data set and transmit a data signal to a physically remote connected terminal.

13. The central office terminal of claim 12 comprising:

an N-line signal interface between the set of codecs from the central office switch assembly and a set of N central office terminal codecs;

a set of M replicas of the client-type modem, wherein the values of N and M are positive integers and the value of M is less than N; and a set of M replicas of the analog switch, each signally coupled to a corresponding one of the set of M client-type modems, for routing input signals from a selected one of the N-line signal interface to a corresponding one of the M client-type modems.

14. The central office terminal of claim 12 further comprising:

a server-type modem, communicatively coupled to the client-type modem, configured to receive a second digital data set corresponding to the first recovered digital data set, encode the second digital data set to render an encoded digital data signal, and transmit an encoded digital data stream representing the first recovered digital data set.

15. The central office terminal of claim 12 wherein the data transmission interface comprises a codec configured to receive digital data corresponding to the first recovered digital data set and to generate a second analog data signal carrying the same data values as the first encoded analog data signal;

thereby providing a repeater functionality which may be replicated a plurality of times over a transmission path between a service provider modem and a subscriber client modem.

16. The central office terminal of claim 15 further comprising:

a server-type modem, communicatively coupled to the client-type modem, configured to receive a second digital data set corresponding to the first recovered digital data set, encode the second digital data set to render an encoded digital data signal, and transmit to the codec an encoded digital data stream representing the first recovered digital data set.

17. A pair gain central office terminal, for incorporation into a network transmission path including a server station including a service provider modem configured to transmit a data signal, and a central office switch assembly including a line switch and a set of codecs, communicatively coupled to the server station to receive the data signal, and wherein the set of codecs are configured to transmit analog data signals including encoded analog data signals corresponding to the data signal, the central office terminal comprising:

a premium transmission path providing an enhanced quality transmission path through the central office terminal;

a standard transmission path providing a standard quality transmission path through the central office terminal;

an analog switch, interposed between the central office switch assembly and the premium transmission path and including a multiple line interface providing separate signal paths for ones of the set of codecs and a single line interface to the premium transmission path, to selectively route signals received from a selected one of the signal paths to the premium transmission path; and a pair gain transmission interface for communicating information between the central office terminal and a connected remote terminal of the pair gain system.

18. The pair gain central office terminal of claim 17 comprising:

an N-line signal interface between the set of codecs from the central office switch assembly and a set of N central office terminal codecs;

a set of M replicas of the premium transmission path, wherein the values of N and M are positive integers and the value of M is less than N; and a set of M replicas of the analog switch, each signally coupled to a corresponding one of the set of M premium transmission paths, for routing input signals from a selected one of the N-line signal interface to a corresponding one of the M premium transmission paths.

19. The pair gain central office terminal of claim 18 wherein each premium transmission path includes a client-type modem.

20. The pair gain central office terminal of claim 19 wherein each premium transmission path includes a server-type modem.

21. The pair gain central office terminal of claim 19 wherein each standard transmission path includes a voice quality codec.

22. A pair gain system for connection within a telephone transmission path from a server station to a subscriber client modem, wherein the server station includes a service provider modem configured to transmit data signals and a central office switch assembly, including a line switch and a set of codecs, communicatively coupled to the server station to receive the data signal, wherein the set of codecs is configured to transmit first encoded analog data signals corresponding to the data signals, the pair gain system comprising:

a digital network transmission link;

a central office terminal including:

a decoder communicatively coupled to the central office switch assembly and configured to receive the first encoded analog data signals and extract from first encoded analog signals first recovered digital data sets;

an analog switch, interposed between signal lines from the set of codecs within the central office switch assembly and the decoder, to route signals received from a selected one of the set of codecs to the decoder; and a digital transmission interface connecting the central office terminal to the digital network transmission link; and a remote terminal communicatively coupled to the digital network transmission link, configured to receive digital data from the digital network transmission link and to transmit a corresponding data signal to the subscriber client modem.

23. The pair gain system of claim 22 further comprising:

a server-type modem, communicatively coupled to the decoder, configured to receive second digital data sets corresponding to the first recovered digital data sets, encode the second digital data sets to render encoded digital data signals, and transmit encoded digital data streams representing the first recovered digital data sets.

24. A method for carrying out high speed transmission of a digital data set from a service provider modem to a subscriber client modem in a network including a server station including the service provider modem and a central office switch assembly including a line switch and a set of codecs and communicatively coupled to the server station, said method comprising the steps:

routing by an analog switch a first encoded analog data signal, corresponding to a first encoded digital data signal originating from the service provider modem and representing an original data set, from a selected one of a set of lines from the set of codecs;

first receiving by a decoder, the first encoded analog data signal routed by the analog switch;

decoding, by the decoder, the first encoded analog data signal to generate a first recovered digital data set, corresponding to the original digital data set, from the first encoded analog data signal;

second receiving, by a server-type modem, a second digital data set corresponding to the first recovered digital data set;

encoding, by the server-type modem, the second digital data set to render an encoded digital data set;

second transmitting, from the server-type modem, an encoded digital data stream representing the encoded digital data set; and third receiving, by the subscriber client modem, a second encoded analog signal corresponding to the encoded digital data stream.

25. The method of claim 24 wherein a client-type modem includes the decoder.

26. The method of claim 24 wherein the server-type modem is located proximate to the decoder.

27. The method of claim 24 wherein a central office terminal of a pair gain system is communicatively coupled to the central office switch assembly and a remote terminal of a pair gain system is communicatively coupled to the subscriber client modem, further comprising the step of:

third transmitting, from the central office terminal to the remote terminal, a data signal representing the first recovered digital data set.

28. The method of claim 24 wherein the server-type modem is separated from the decoder by a digital network transmission link and wherein the method comprises the further step of third transmitting, via the digital network transmission link, a digital data stream representing the first recovered digital data set.

29. The method of claim 24 wherein the first receiving and decoding steps are performed at a phone company central office.

30. The method of claim 29 wherein the decoder is proximate to a codec from which the first encoded analog data signal is transmitted.

31. The method of claim 24 further comprising the steps of:

transmitting, by the service provider modem, the first encoded digital data signal to the central office switch assembly; and converting, by a codec within the central office switch assembly, the first encoded digital data signal to the first encoded analog data signal.

32. The method of claim 24 further comprising the steps of:

forth transmitting, by the subscriber client modem, a third encoded analog signal corresponding to a digital data message for the service provider modem.

33. The method of claim 32 wherein the second encoded analog signal and the third encoded analog signal are transmitted in accordance with different modem-based data transmission protocols.

34. The method of claim 24 wherein a client-type modem includes the decoder, the method further comprising the step of:

indirectly transmitting the first recovered digital data set from the client-type modem to the server-type modem by first transferring the first recovered digital data set from the client-type modem to a control processor and second transferring the first recovered digital data set from the control processor to the server-type modem.

35. The method of claim 24 wherein a client-type modem includes the decoder, the method further comprising the step of:

directly transmitting the first recovered digital data set from the client-type modem to the server-type modem.

36. The method of claim 24 further comprising the step of:

analog encoding, by a codec configured to receive digital output from the serve-rtype modem, the encoded digital data stream representing the encoded digital data set to render the second encoded analog signal.

37. A pair gain central office terminal installation, for incorporation into a set network transmission paths including one or more server stations including service provider modems configured to transmit data signals, and a central office switch assembly including a line switch and a set of codecs, communicatively coupled to the server stations to receive the data signals, and wherein the set of codecs are configured to transmit analog data signals including encoded analog data signals corresponding to the data signals, the pair gain central office terminal installation comprising:

a premium transmission path providing an enhanced quality transmission path through the central office terminal;

a standard transmission path providing a standard quality transmission path through the central office terminal;

a switch, interposed between the central office switch assembly and the premium transmission path and including a multiple line interface providing separate signal paths for ones of the set of codecs and a designated channel interface to the premium transmission path, to selectively route signals received from a selected one of the signal paths to the premium transmission path; and a pair gain transmission interface for communicating information between the central office terminal installation and a connected remote terminal of the pair gain system.

38. The pair gain central office terminal installation of claim 37 wherein the switch is an analog switch.

39. The pair gain central office terminal of claim 37 comprising:
- an N-line signal interface between the set of codecs from the central office switch assembly and a set of N central office terminal codecs;
- a set of M replicas of the premium transmission path, wherein the values of N and M are positive integers and the value of M is less than N; and
- a set of M replicas of the analog switch, each signally coupled to a corresponding one of the set of M premium transmission paths, for routing input signals from a selected one of the N-line signal interface to a corresponding one of the M premium transmission paths.

40. The pair gain central office terminal of claim 39 wherein each premium transmission path includes a client-type modem.

41. The pair gain central office terminal of claim 40 wherein each premium transmission path includes a server-type modem.

42. The pair gain central office terminal of claim 40 wherein each standard transmission path includes a voice quality codec.

* * * * *